(12) United States Patent
Beiser

(10) Patent No.: US 12,146,531 B2
(45) Date of Patent: Nov. 19, 2024

(54) CLUTCH ASSEMBLY

(71) Applicant: Means Industries, Inc., Saginaw, MI (US)

(72) Inventor: Carl Thomas Beiser, Frankenmuth, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 18/111,169

(22) Filed: Feb. 17, 2023

(65) Prior Publication Data

US 2023/0279907 A1 Sep. 7, 2023

Related U.S. Application Data

(60) Provisional application No. 63/316,990, filed on Mar. 5, 2022.

(51) Int. Cl.
| | |
|---|---|
| *F16D 21/04* | (2006.01) |
| *F16D 11/16* | (2006.01) |
| *F16D 41/12* | (2006.01) |
| *F16D 41/16* | (2006.01) |
| *F16D 11/00* | (2006.01) |
| *F16D 121/20* | (2012.01) |

(52) U.S. Cl.
CPC .............. *F16D 21/04* (2013.01); *F16D 11/16* (2013.01); *F16D 41/125* (2013.01); *F16D 41/16* (2013.01); *F16D 2011/006* (2013.01); *F16D 2121/20* (2013.01); *F16D 2500/10493* (2013.01)

(58) Field of Classification Search
None
See application file for complete search history.

(56) References Cited

U.S. PATENT DOCUMENTS

| 5,399,131 | A | 3/1995 | Kamada et al. | |
|---|---|---|---|---|
| 9,994,225 | B1* | 6/2018 | Lee | B60W 30/19 |
| 2016/0290417 | A1* | 10/2016 | Brubaker | F16D 41/14 |
| 2018/0094677 | A1 | 4/2018 | Cioc et al. | |
| 2019/0344655 | A1* | 11/2019 | Pettersson | B60W 20/40 |
| 2020/0109749 | A1* | 4/2020 | Thomas | F16D 41/125 |
| 2020/0325970 | A1 | 10/2020 | Lahr et al. | |

OTHER PUBLICATIONS

PCT/US2023/14279, Search Report, Jun. 2, 2023.
PCT/US2023/14279, Written Opinion, Jun. 2, 2023.
PCT/US2023/14279, Search Strategy, Jun. 2, 2023.

* cited by examiner

*Primary Examiner* — Timothy Hannon
(74) *Attorney, Agent, or Firm* — Burgess Law Office, PLLC

(57) ABSTRACT

A clutch assembly or module having multiple one-way clutches, each clutch operates independently of the others to control torque transmission to and from a common or shared notch plate. The assembly or module also controls rotation, including the direction thereof, of the common or shared notch plate. Depending upon the position of each one-way clutch, multiple modes of torque transfer and common or shared notch plate rotation can be achieved.

17 Claims, 37 Drawing Sheets

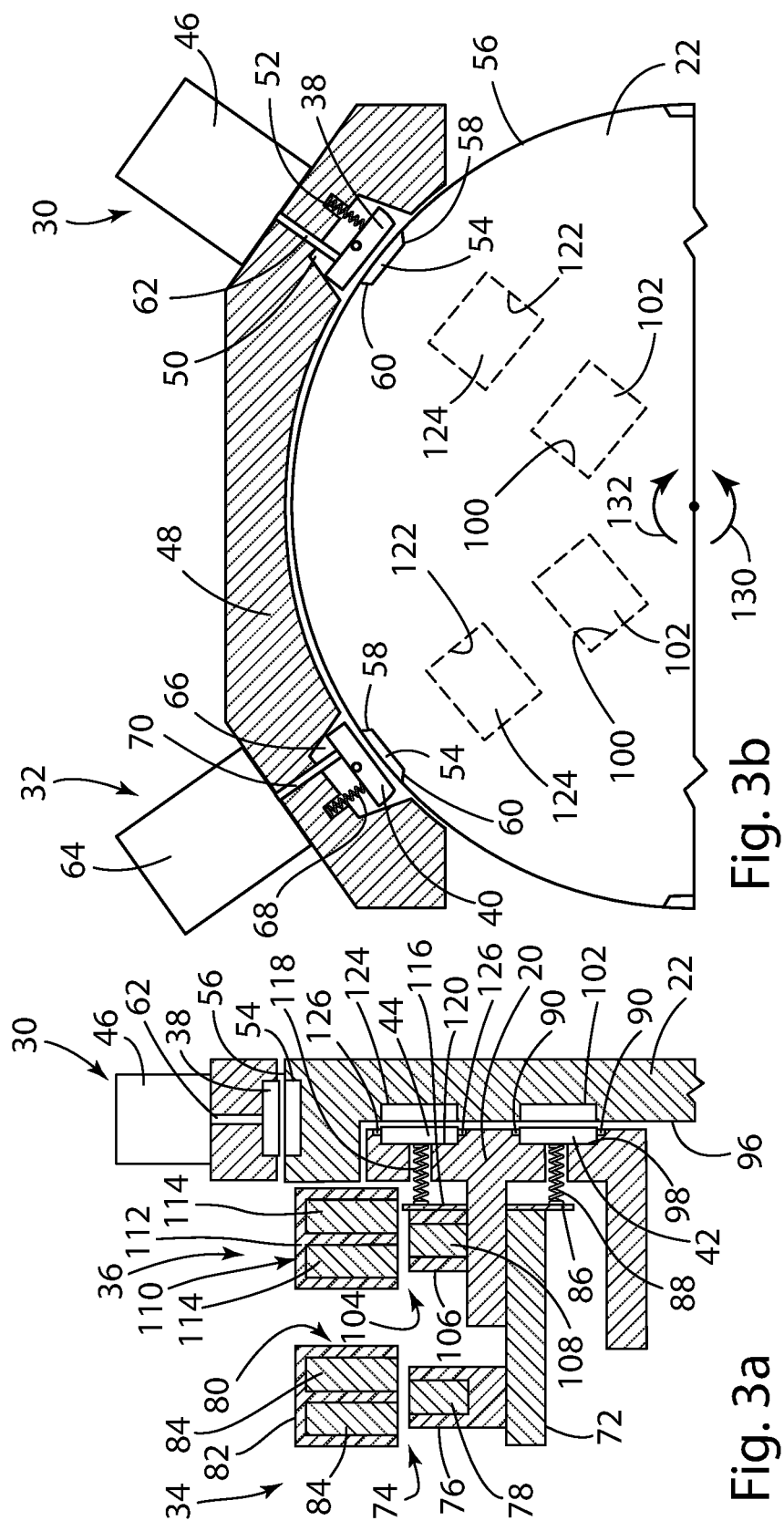

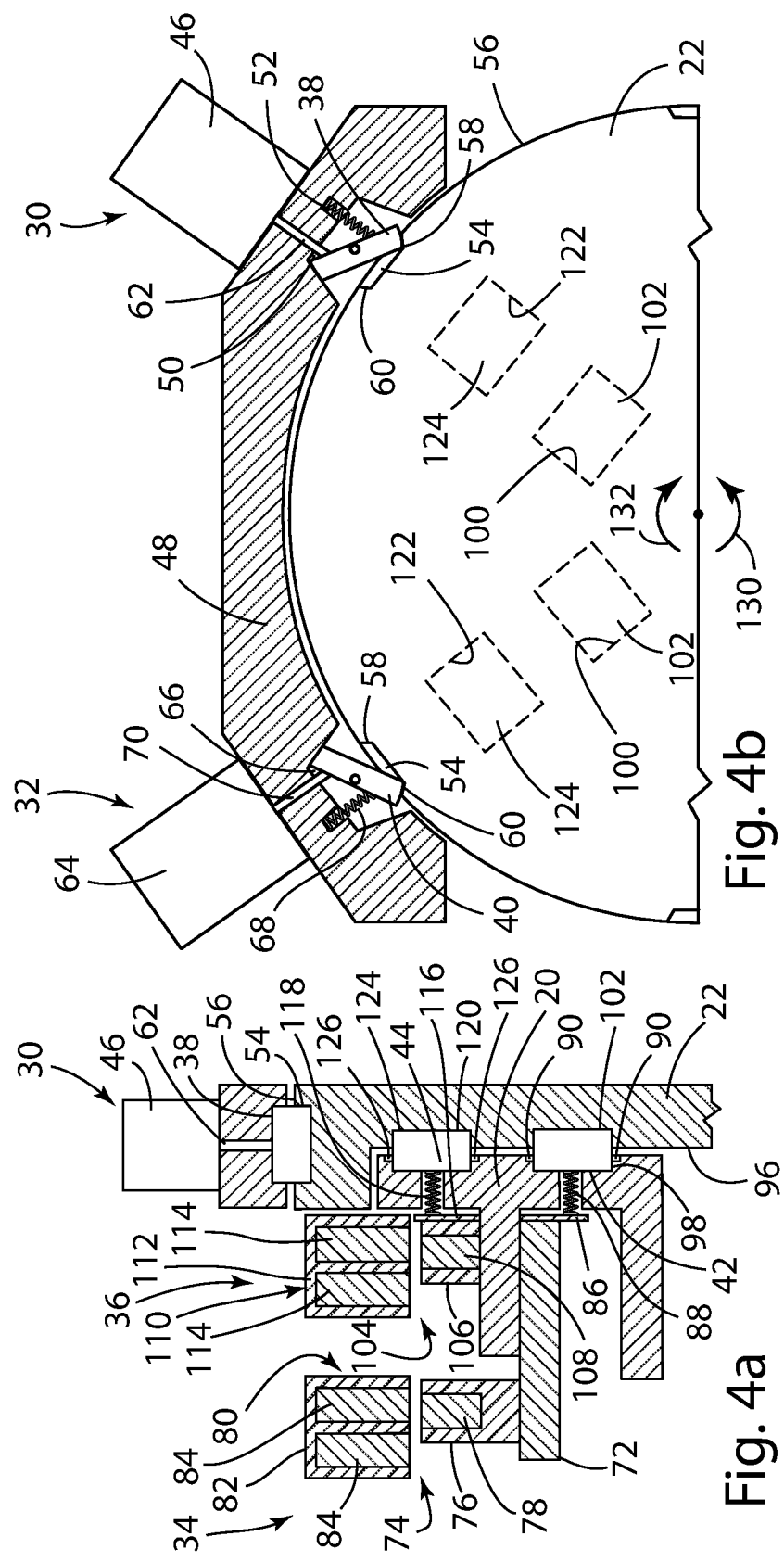

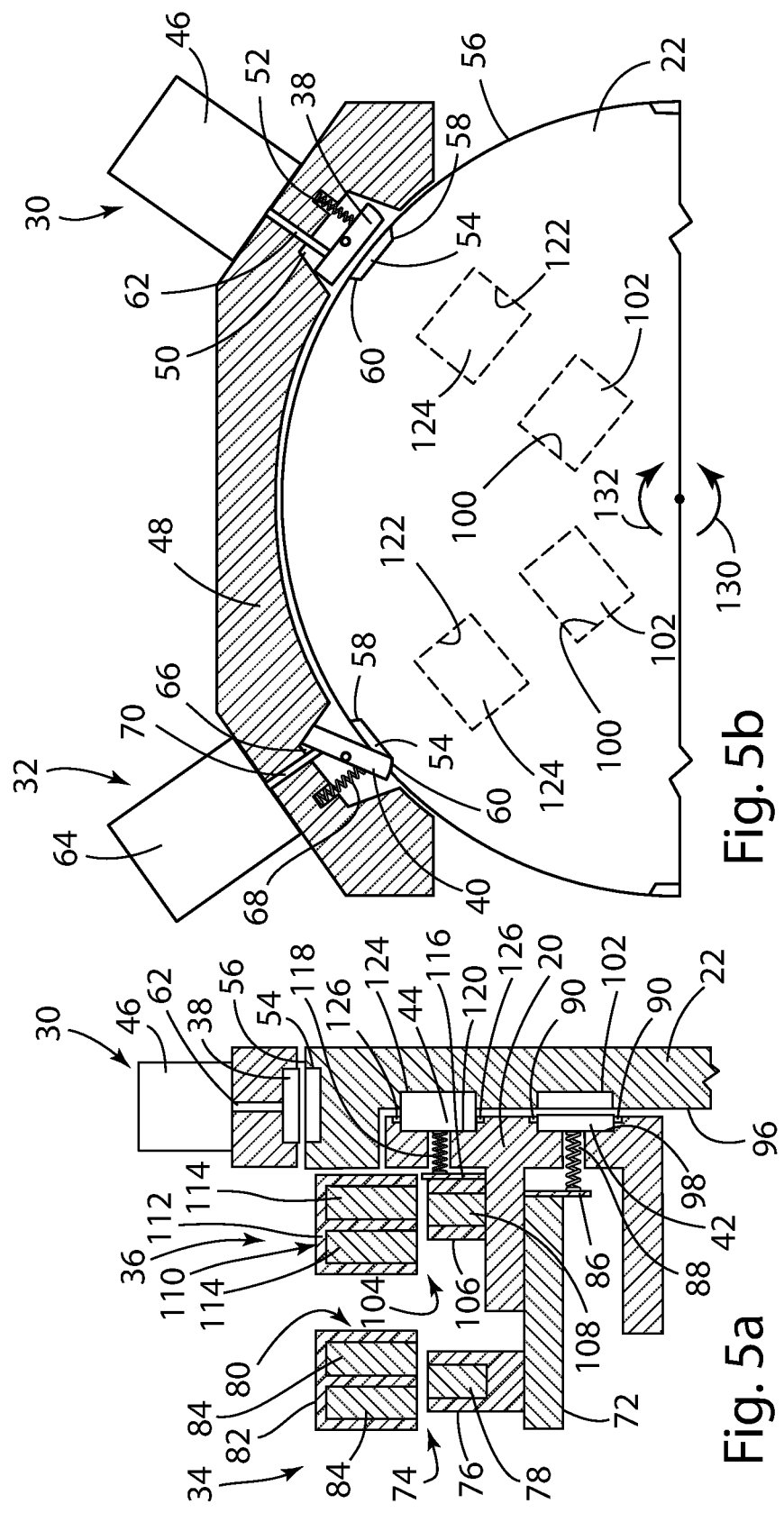

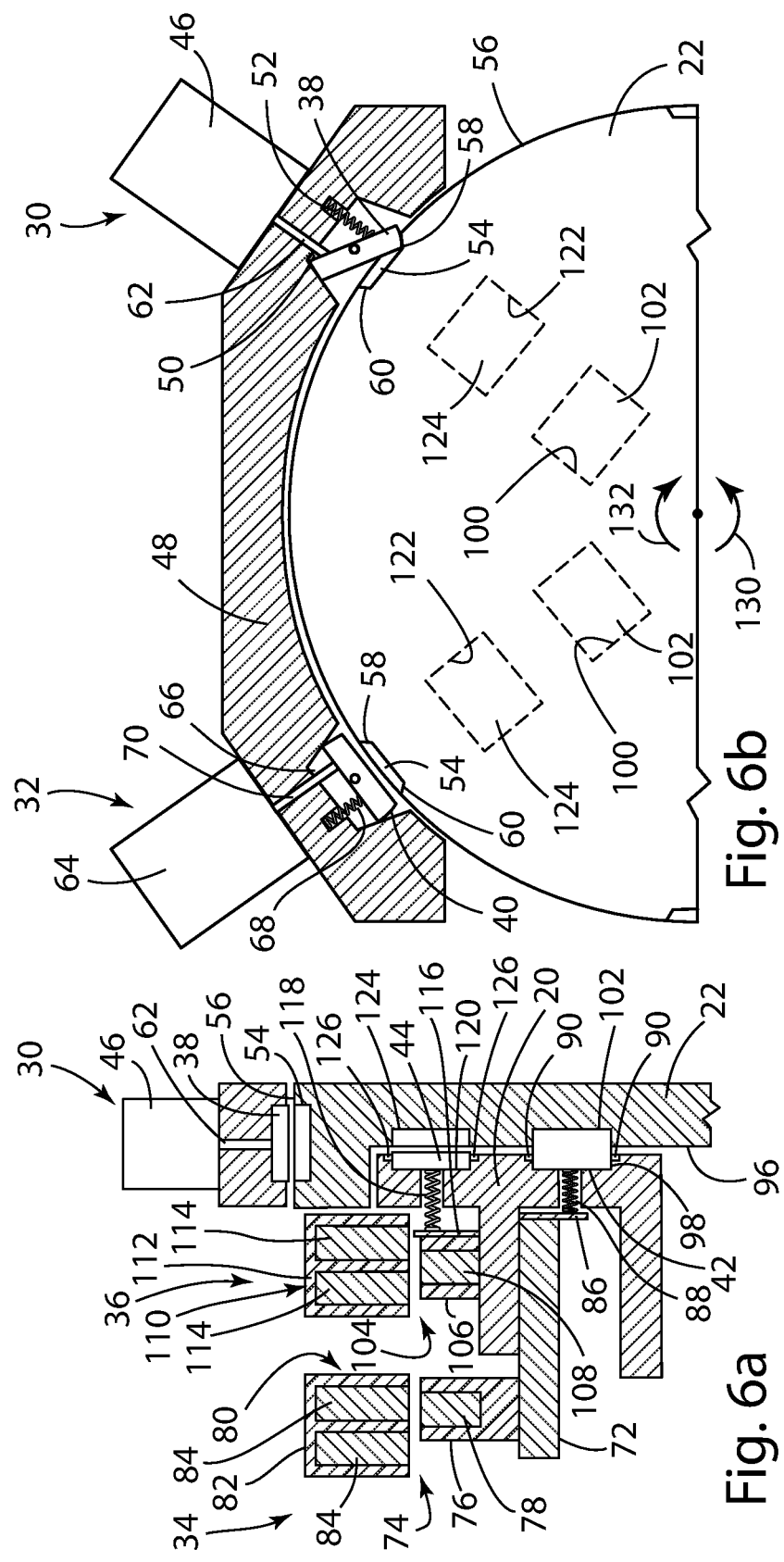

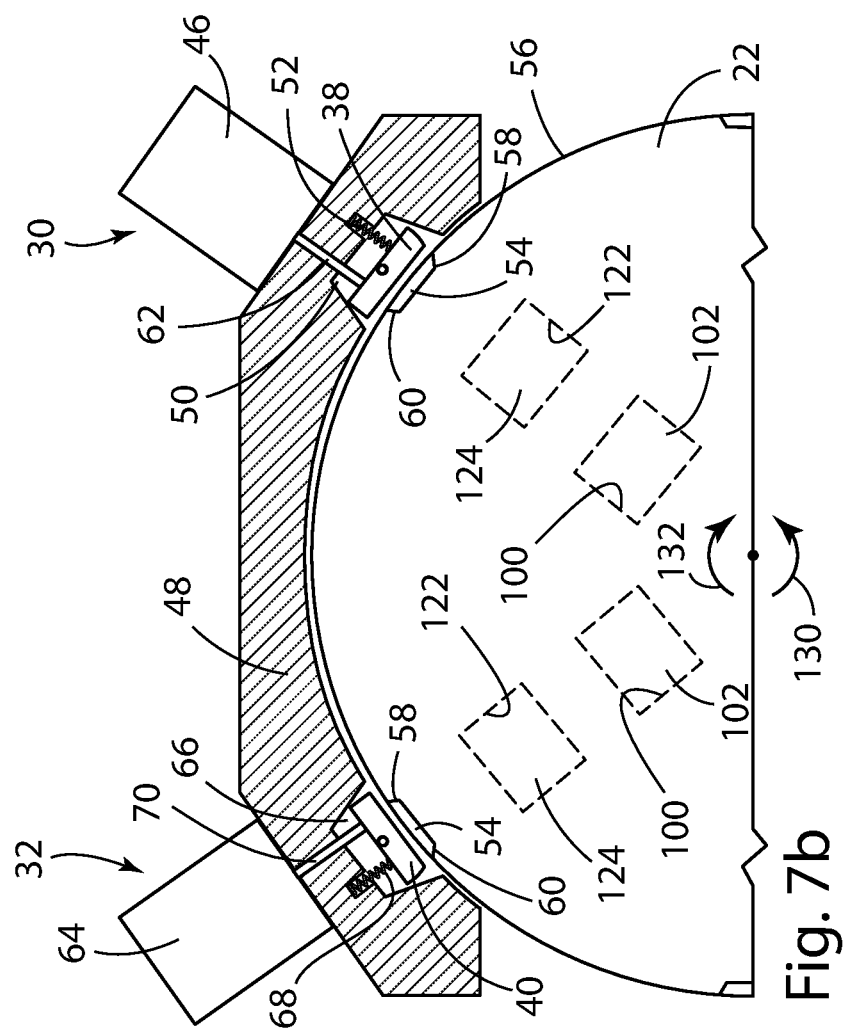
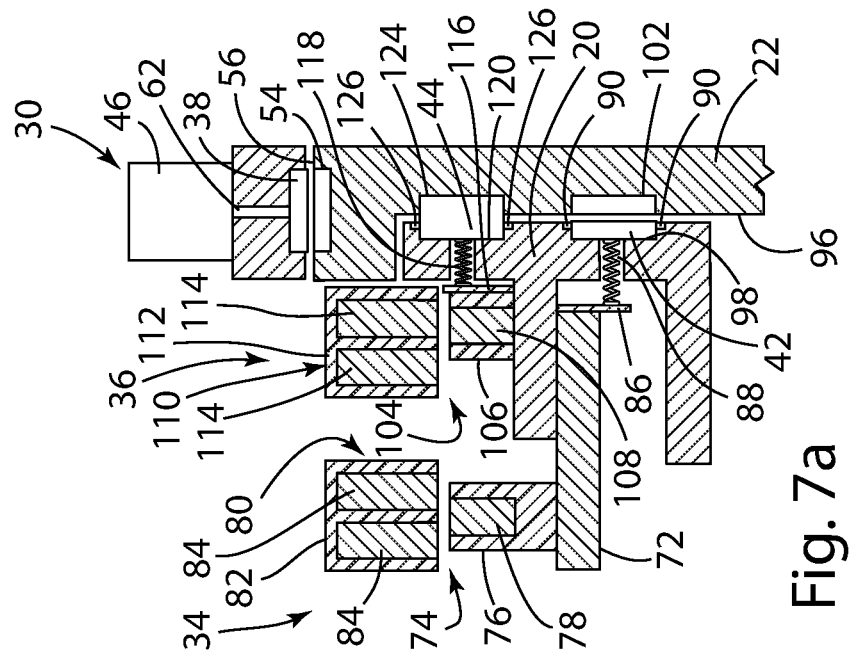
Fig. 7a
Fig. 7b

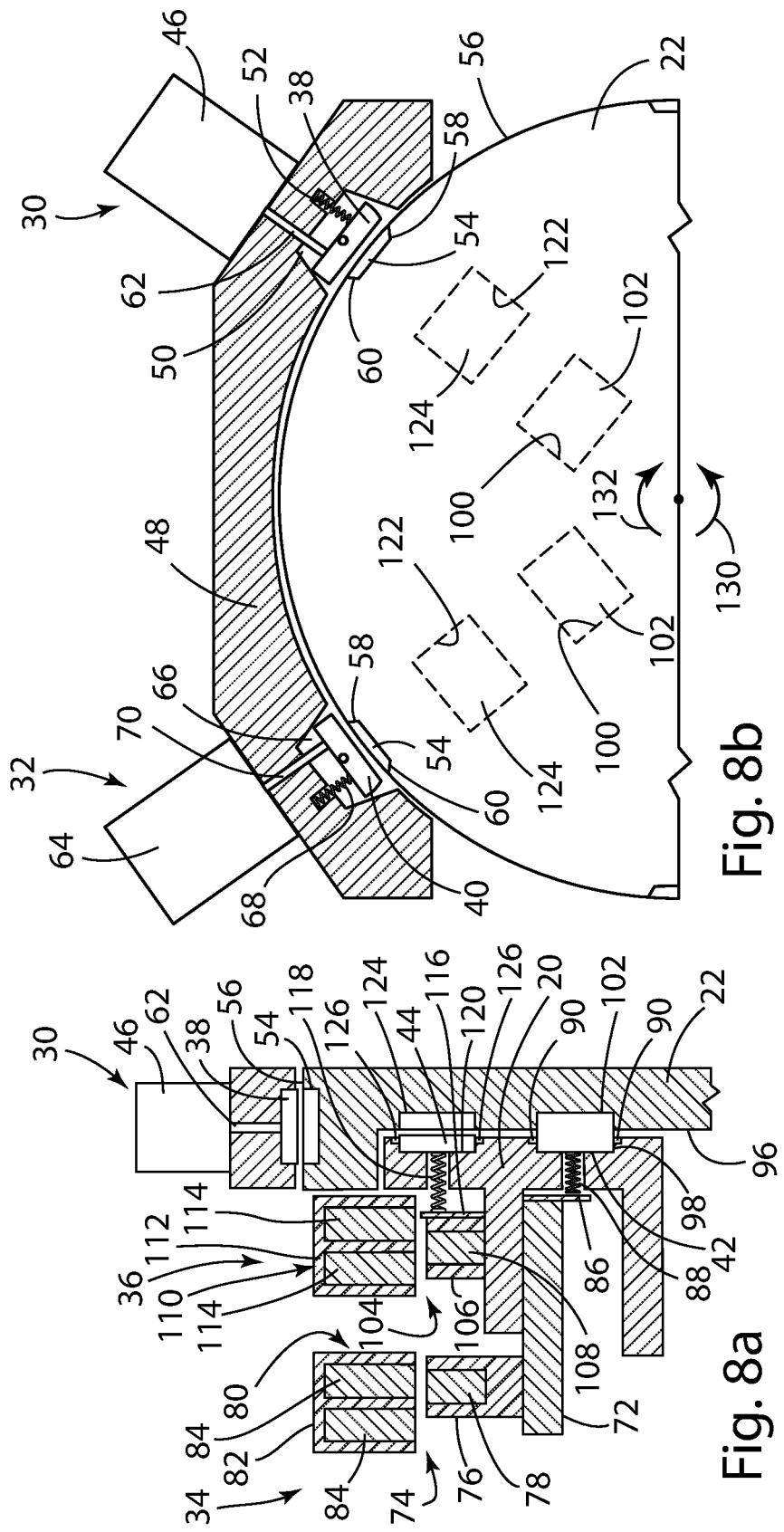

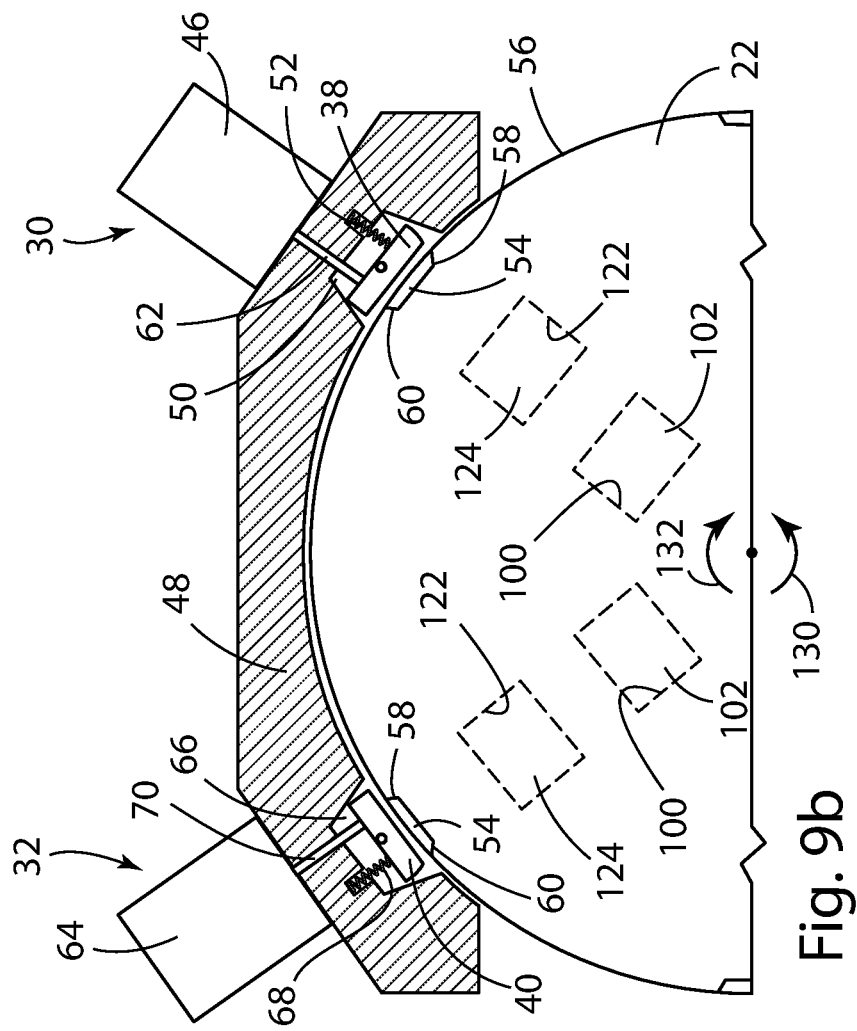
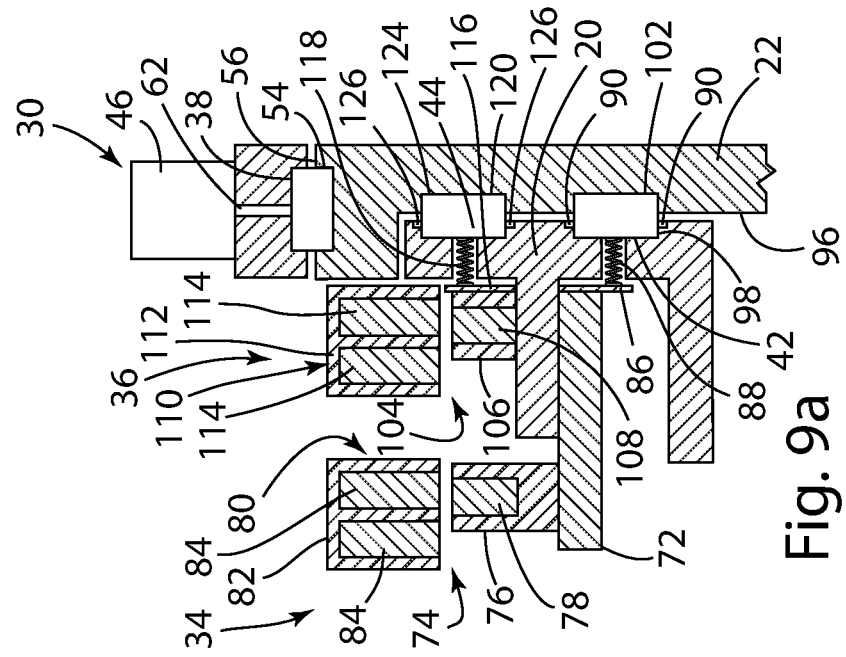
Fig. 9a
Fig. 9b

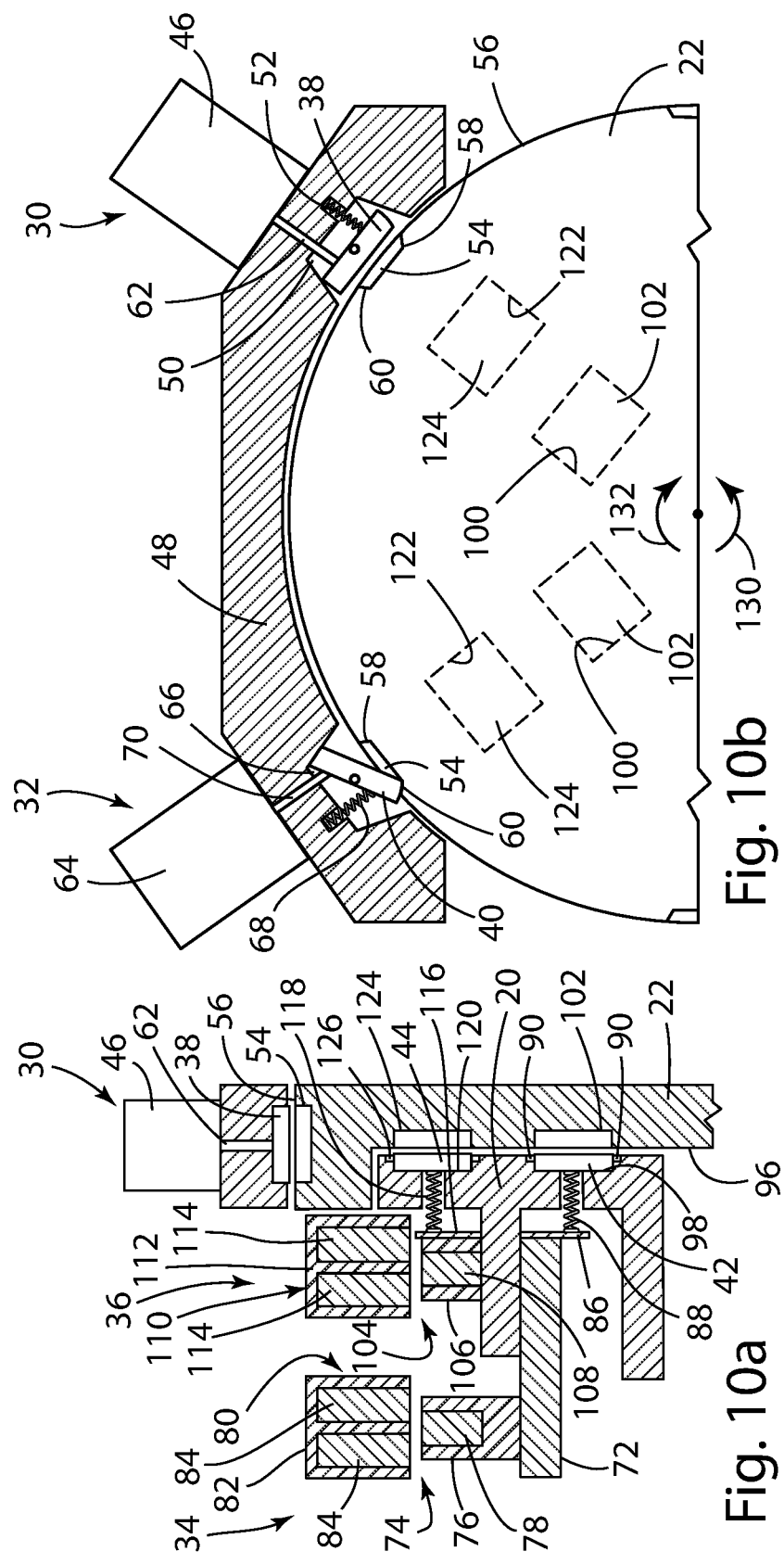

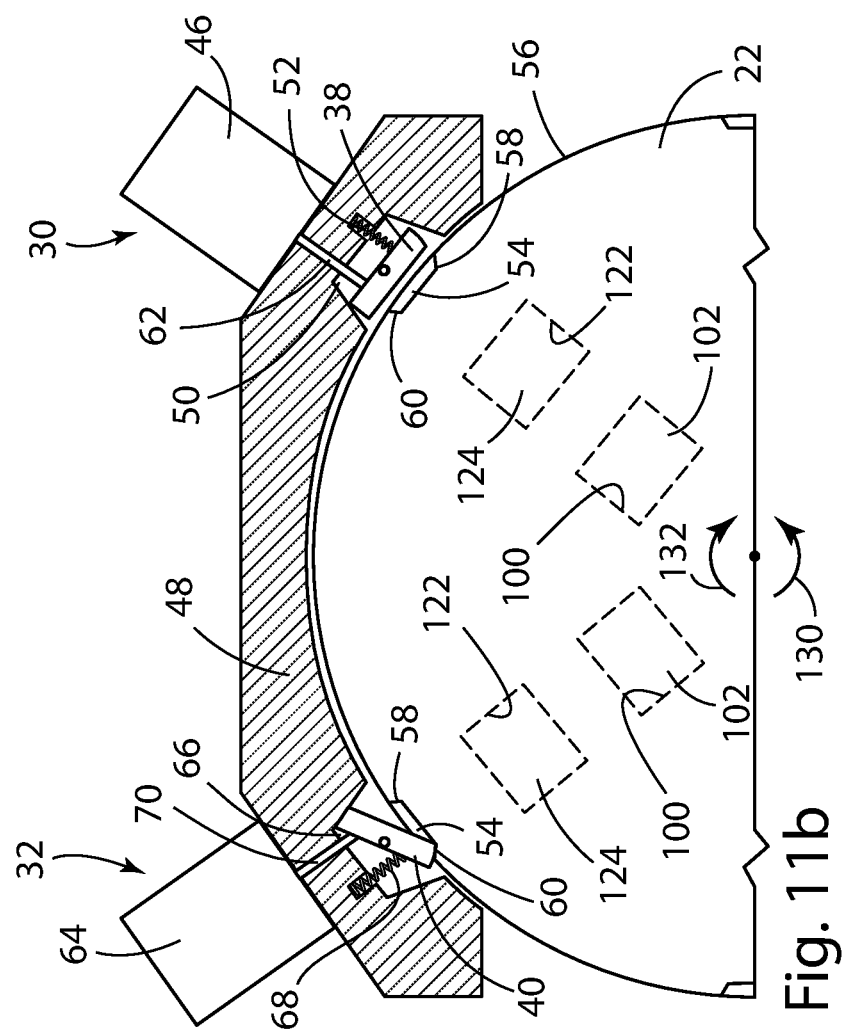
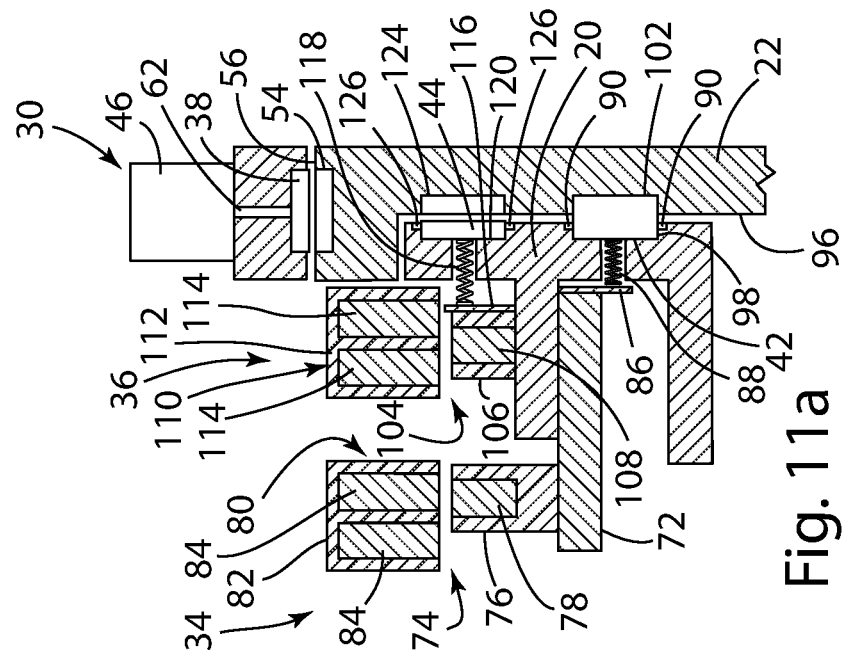

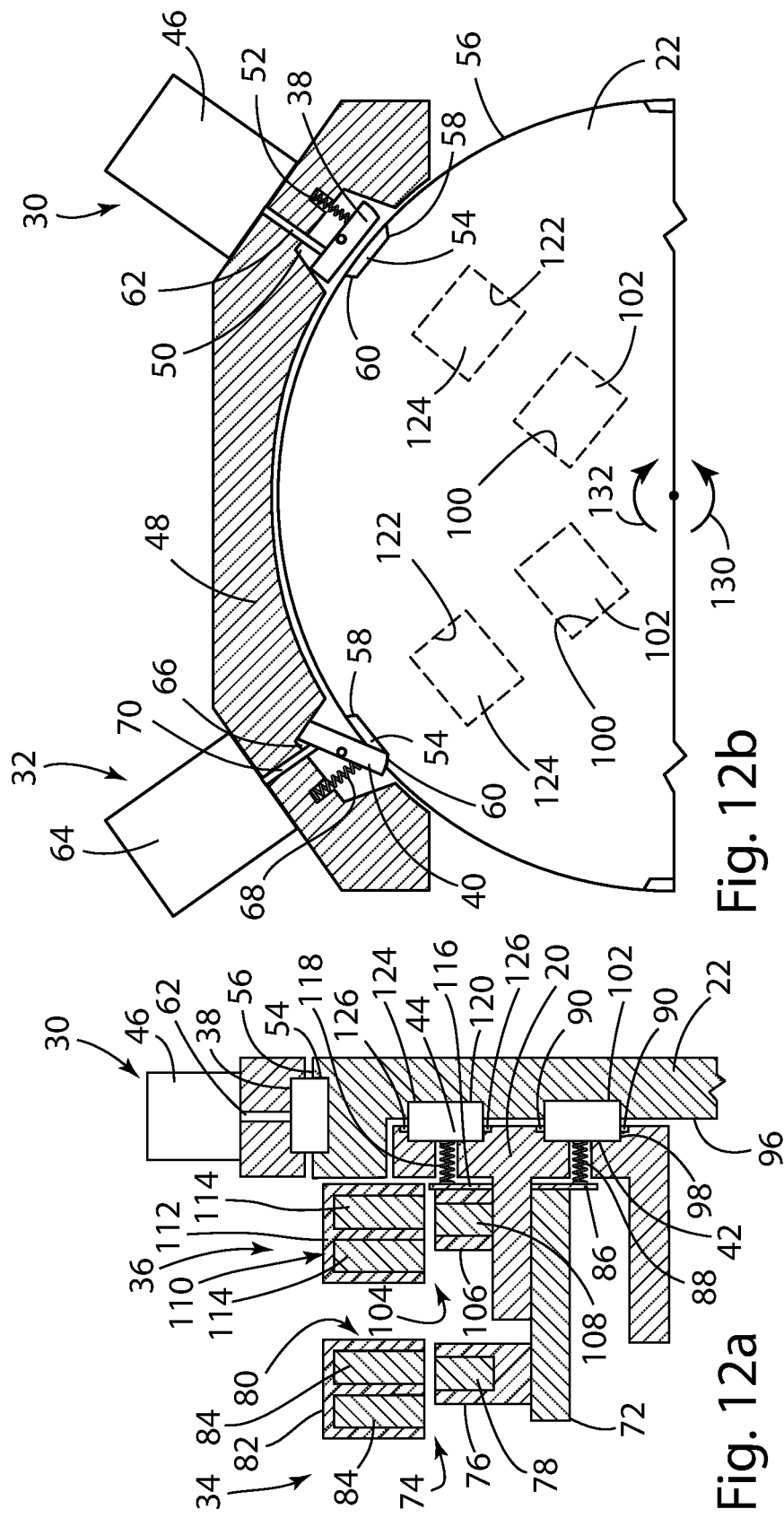

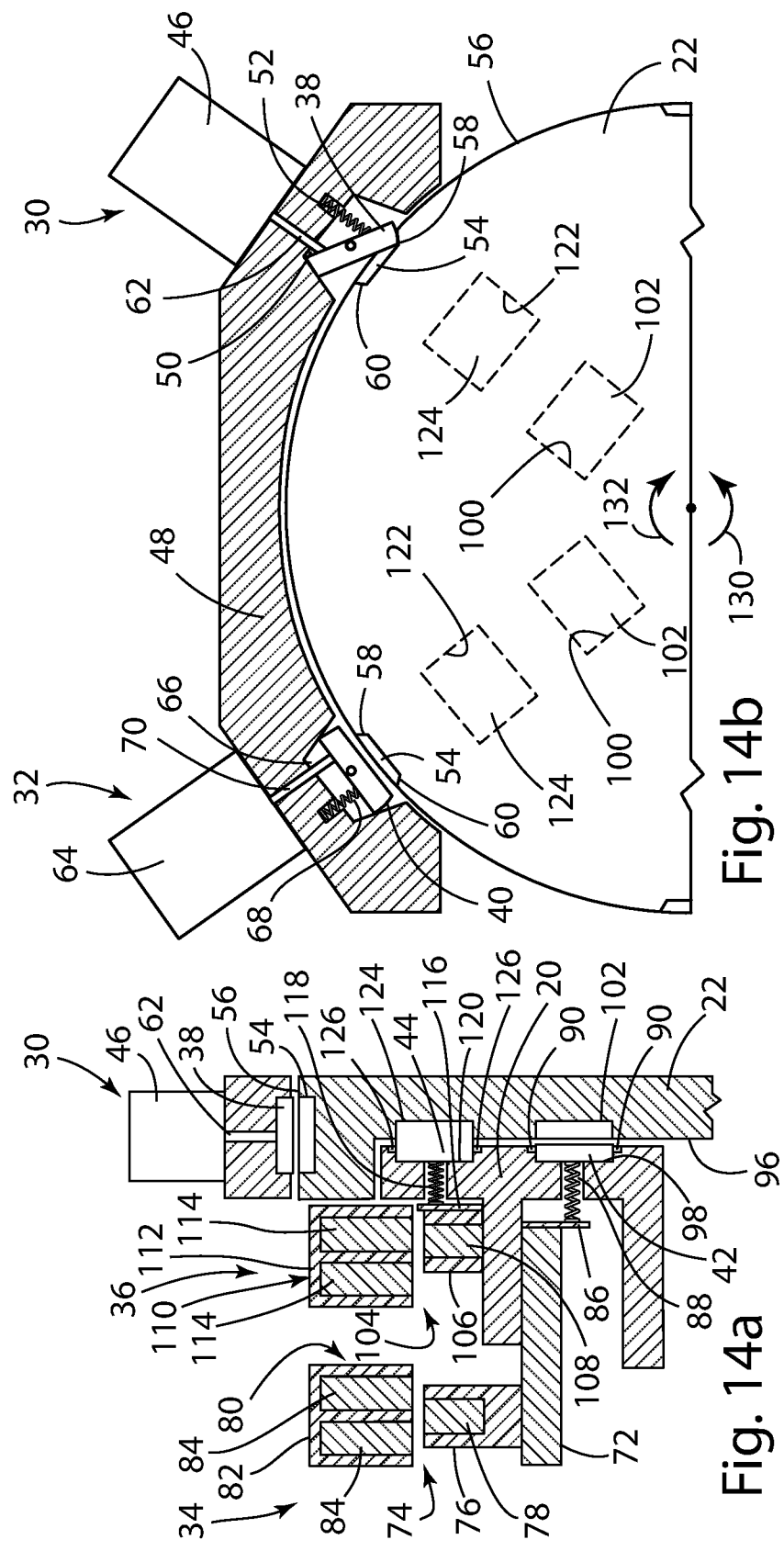

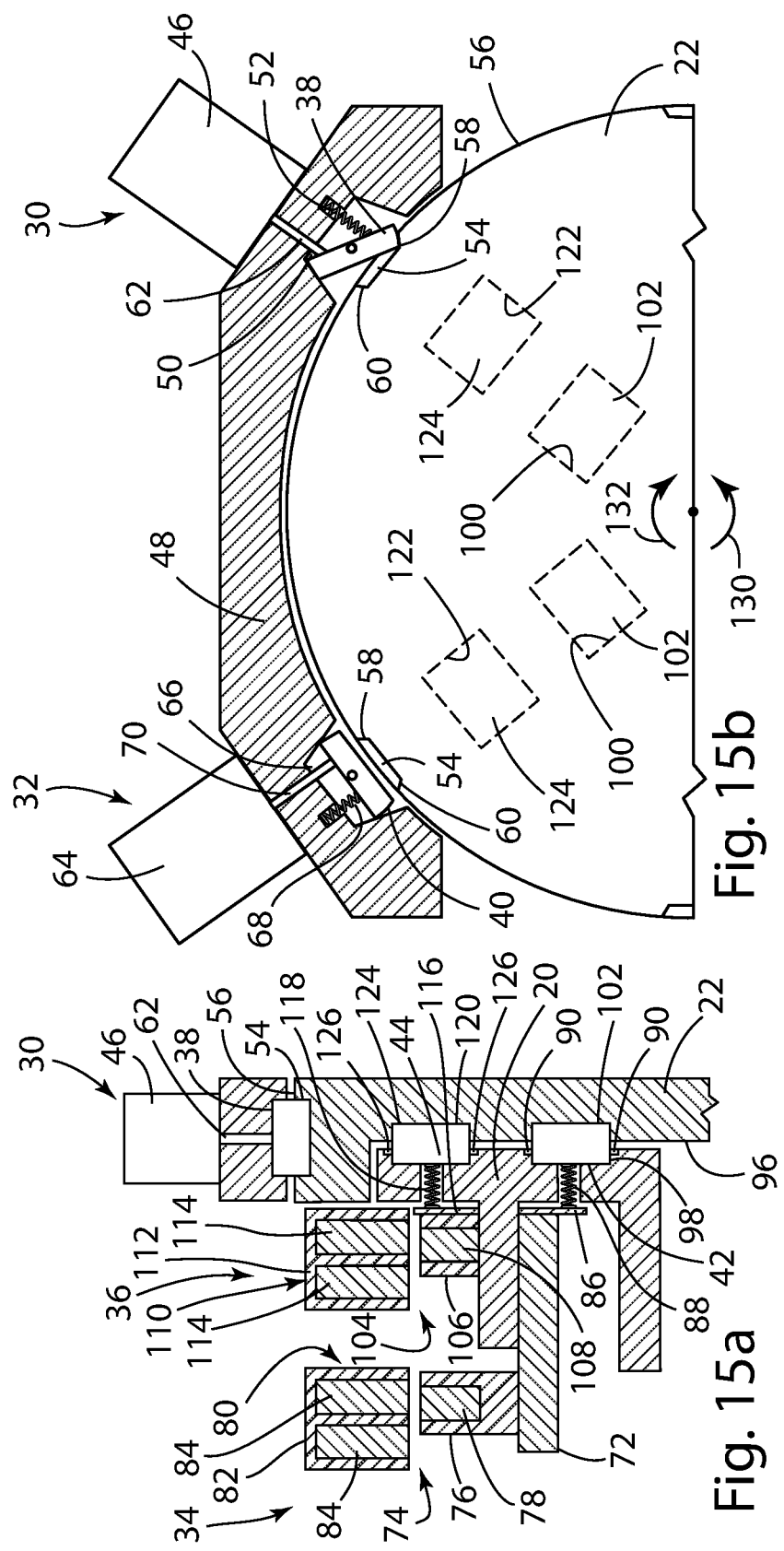

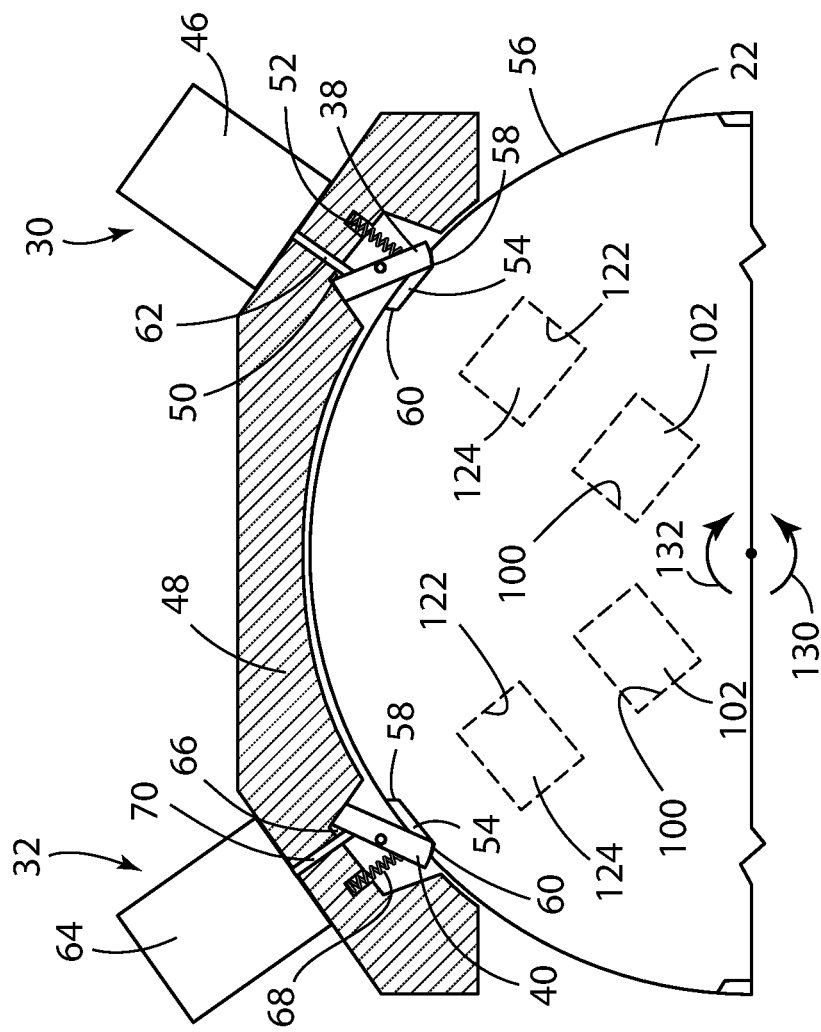
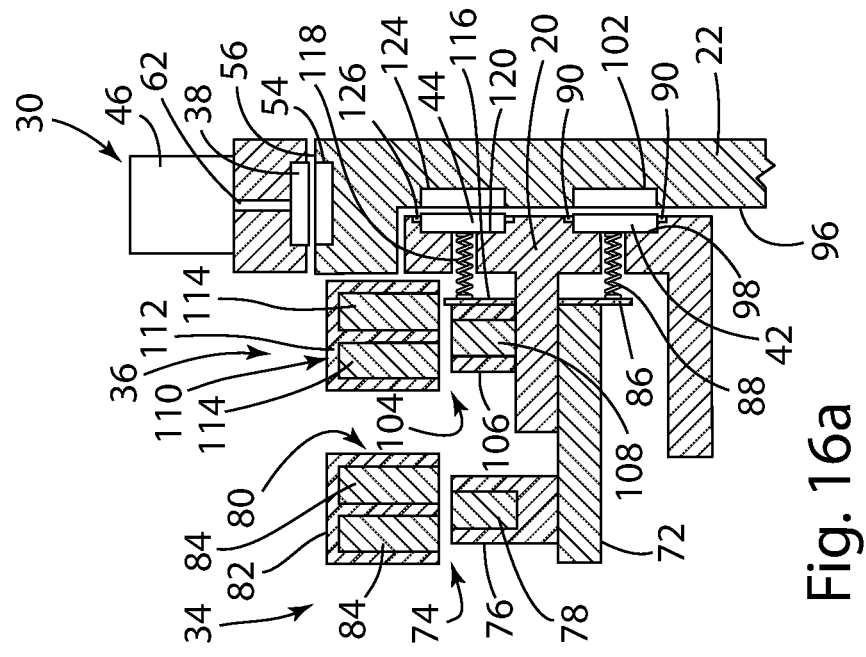
Fig. 16b
Fig. 16a

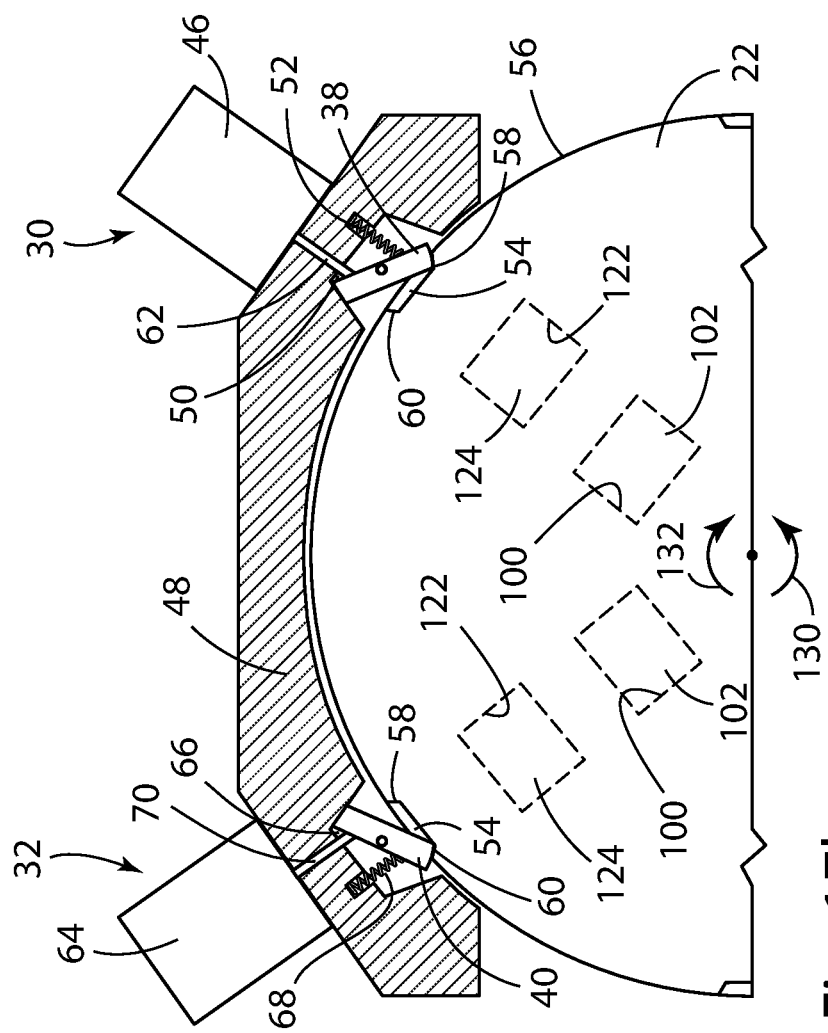
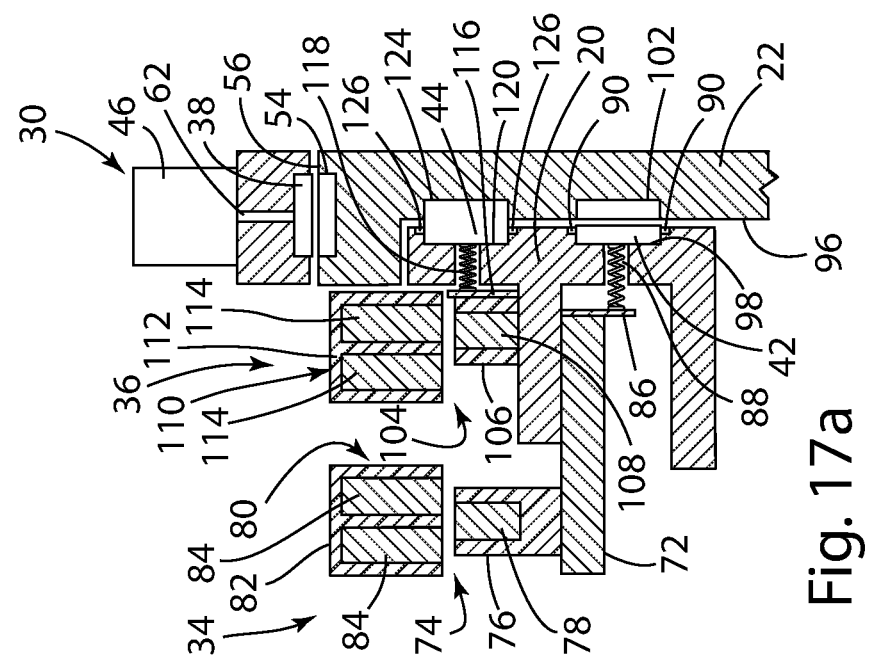
Fig. 17b
Fig. 17a

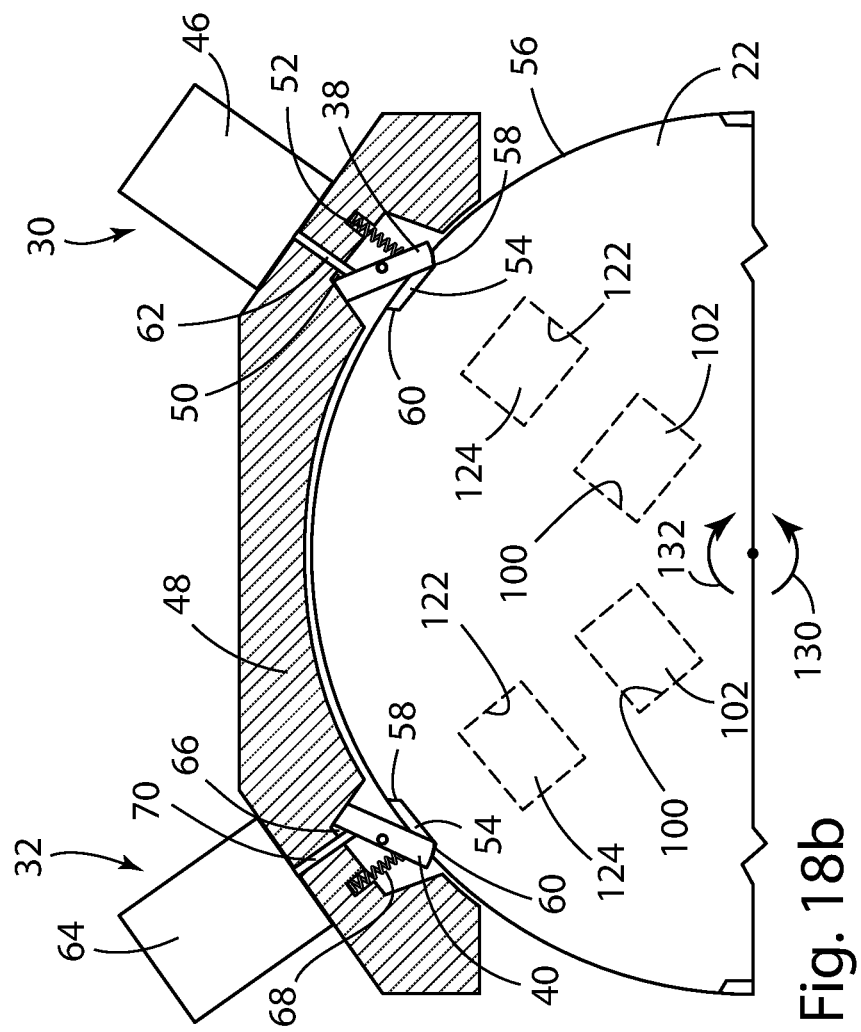
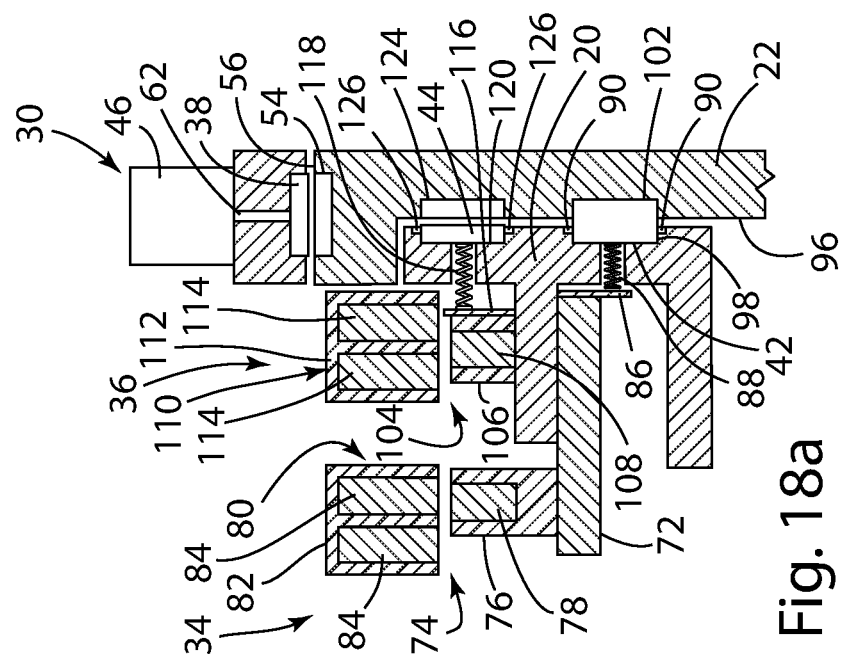
Fig. 18a
Fig. 18b

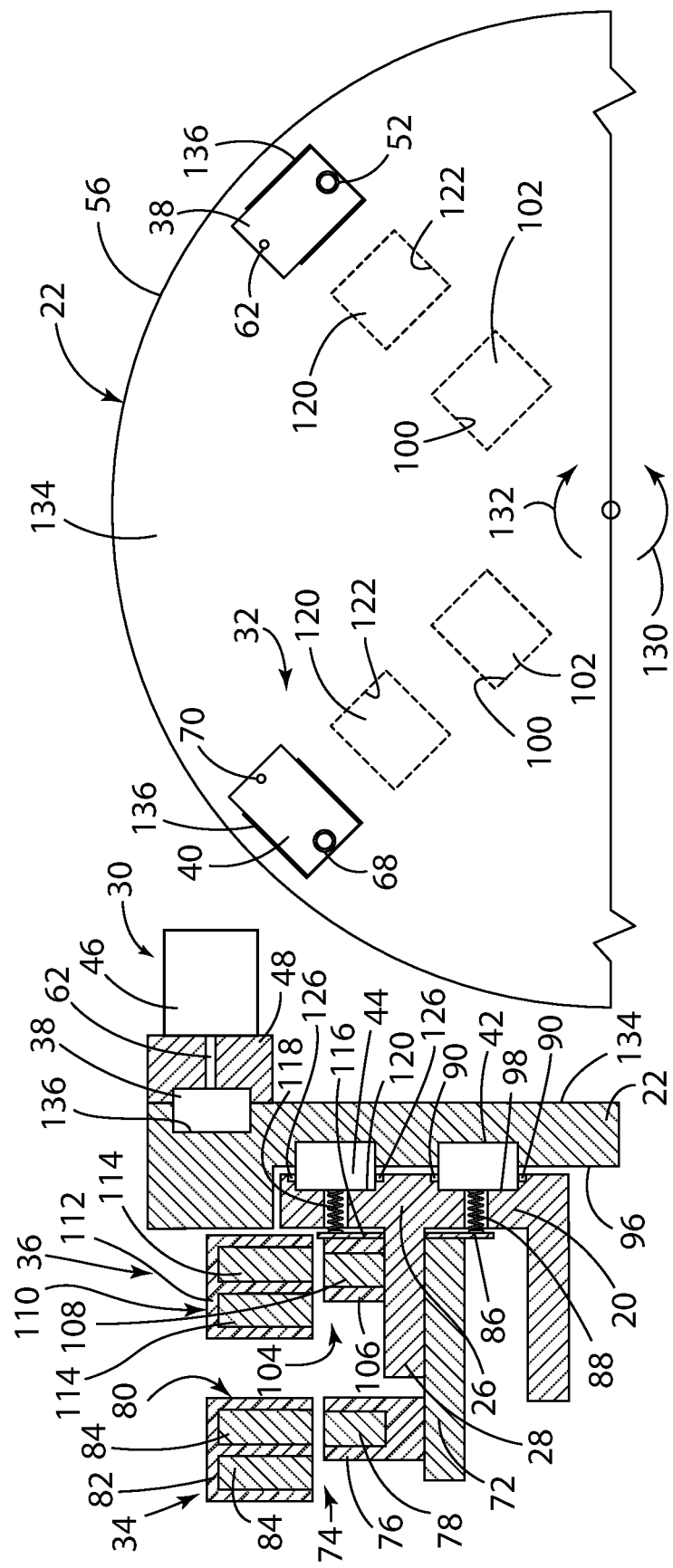

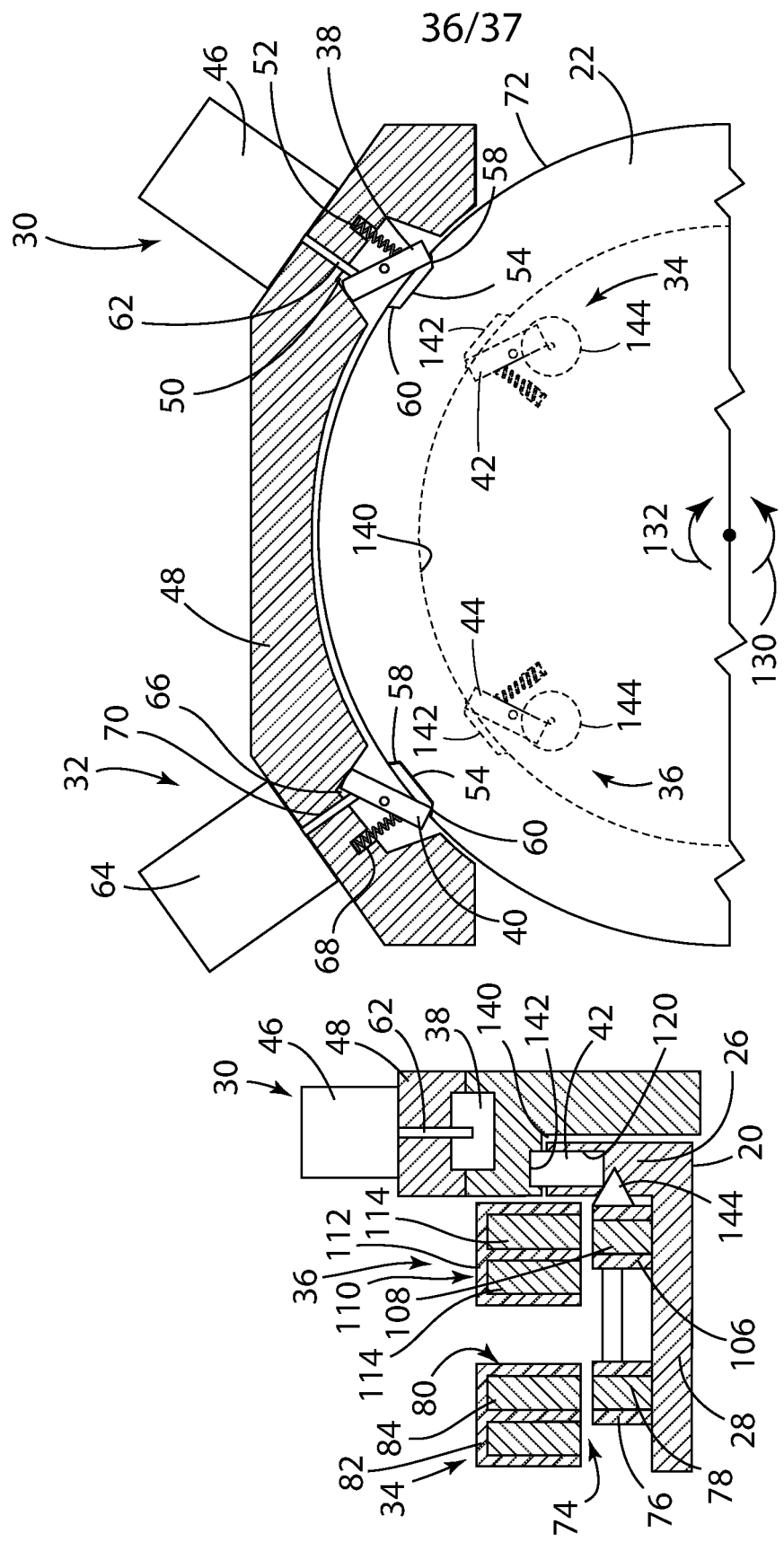

CLUTCH ASSEMBLY

CROSS-REFERENCE TO RELATED APPLICATIONS

This application claims the benefit of U.S. Provisional Application No. 63/316,990, filed on Mar. 5, 2022. The disclosure of the above application is incorporated herein by reference.

BACKGROUND OF THE INVENTION

1. Field of the Invention

The invention generally relates to a vehicle power train or drive system; and, more specifically, a drive system using a clutch assembly.

2. Description of Related Art

Vehicle powertrains or drive systems typically incorporate multiple clutch elements. Existing powertrains are configured as concentric and parallel axis architectures, including electric motors.

In the field of automotive technology, motor vehicle drive trains using electric motors and planetary drive trains include controllable or selectable coupling assemblies, for example, one-way clutches. These coupling assemblies can be electromagnetically operated and magnetically controlled.

These one-way clutches often include first and second members and at least one locking element (e.g., a strut, a pawl, etc.). The locking element moves between a deployed position, wherein the locking element extends from the first member and engages the second member, and a non-deployed position, wherein the locking element does not extend from the first member. Whereby, the first and second members are disengaged from each other.

Various types of selectable one-way clutches, including those using a selector plate, a solenoid, and a linear actuator, are known. The foregoing are examples of one-way clutches that may be used in the clutch system disclosed herein. The foregoing are not exclusive; other selective or one-way clutches may be used and are known.

SUMMARY OF THE INVENTION

A clutch assembly including a housing, and input shaft, and an output shaft. The clutch assembly further including a first selectable one-way clutch coupling the housing to the output shaft, a second selectable one-way clutch coupling the housing to the output shaft, the second selectable one-way clutch operating independently of the first selectable one-way clutch, a third selectable one-way clutch coupling the input shaft to the output shaft, and a fourth selectable one-way clutch coupling the input shaft to the output shaft, the fourth selectable one-way clutch operating independently of the third selectable one-way clutch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The drawings are not necessarily to scale and may be illustrated by phantom lines, diagrammatic representations, and fragmentary views. In certain instances, details unnecessary for an understanding of the embodiments or details that render other details difficult to perceive may have been omitted. In addition, common and well-understood elements useful in commercially feasible embodiments are often not depicted to provide a less obstructed view of the embodiments of the present disclosure.

The present invention will become more fully understood from the detailed description and the accompanying drawings, wherein:

FIG. 3A is a schematic, cross-sectional, partial front view; FIG. 3B is a schematic side view with a portion in section.

FIG. 4A is a schematic, cross-sectional, partial front view; FIG. 4B is a schematic side view with a portion in section.

FIG. 5A is a schematic, cross-sectional, partial front view; FIG. 5B is a schematic side view with a portion in section.

FIG. 6A is a schematic, cross-sectional, partial front view; FIG. 6B is a schematic side view with a portion in section.

FIG. 7A is a schematic, cross-sectional, partial front view; FIG. 7B is a schematic side view with a portion in section.

FIG. 8A is a schematic, cross-sectional, partial front view; FIG. 8B is a schematic side view with a portion in section.

FIG. 9A is a schematic, cross-sectional, partial front view; FIG. 9B is a schematic side view with a portion in section.

FIG. 10A is a schematic, cross-sectional, partial front view; FIG. 10B is a schematic side view with a portion in section.

FIG. 11A is a schematic, cross-sectional, partial front view; FIG. 11B is a schematic side view with a portion in section.

FIG. 12A is a schematic, cross-sectional, partial front view; FIG. 12B is a schematic side view with a portion in section.

FIG. 14A is a schematic, cross-sectional, partial front view; FIG. 14B is a schematic side view with a portion in section.

FIG. 15A is a schematic, cross-sectional, partial front view; FIG. 15B is a schematic side view with a portion in section.

FIG. 16A is a schematic, cross-sectional, partial front view; FIG. 16B is a schematic side view with a portion in section.

FIG. 17A is a schematic, cross-sectional, partial front view; FIG. 17B is a schematic side view with a portion in section.

FIG. 18A is a schematic, cross-sectional, partial front view; FIG. 18B is a schematic side view with a portion in section.

FIG. 19A is a cross-sectional schematic side view illustrating a clutch assembly or module, with portions removed, according to an additional embodiment. FIG. 19Bb is a cross-sectional schematic side view of a portion of the assembly of FIG. 19A from the right side of the notch plate with portions removed.

FIG. 20A is a cross-sectional schematic side view illustrating a clutch assembly or module or module, with portions removed, according to another embodiment. FIG. 20B is a cross-sectional schematic side view of a portion of the clutch assembly of FIG. 20B from the right side of the notch plate with portions removed.

DETAILED DESCRIPTION OF THE PREFERRED EMBODIMENTS

The following description of the preferred embodiment(s) is merely exemplary in nature and is in no way intended to limit the invention, its application, or its uses.

Examples of the present invention are disclosed herein; however, it is to be understood that the disclosed embodiments are merely exemplary of the invention that may be embodied in various and alternative forms. The figures are not necessarily to scale; some features may be exaggerated or minimized to show details of the components. Therefore, specific structural and functional details disclosed herein are not to be interpreted as limiting but merely as a representative basis for teaching one skilled in the art to employ the present invention.

A "clutch," which may be referred to as coupling or brake, establishes and disestablishes power flow paths from a power source to an output. Clutches and brakes are used to drive or hold members of a transmission. A clutch connects one element to another and may be referred to as a brake when it connects or ties an element to ground. "Ground" refers to a stationary or fixed member, for example, a transmission case. The term "clutch" also refers to a coupling used to connect and disconnect a driving and a driven part of a mechanism—for example, a motor side input shaft to a wheel side output shaft. The term "brake" further refers to a clutch wherein one of the members is drivably connected to a torque delivery element, and the other member is anchored and held stationary to a housing or tied to ground. The terms "coupling," "clutch," and "brake" may be used interchangeably.

Figure 1:
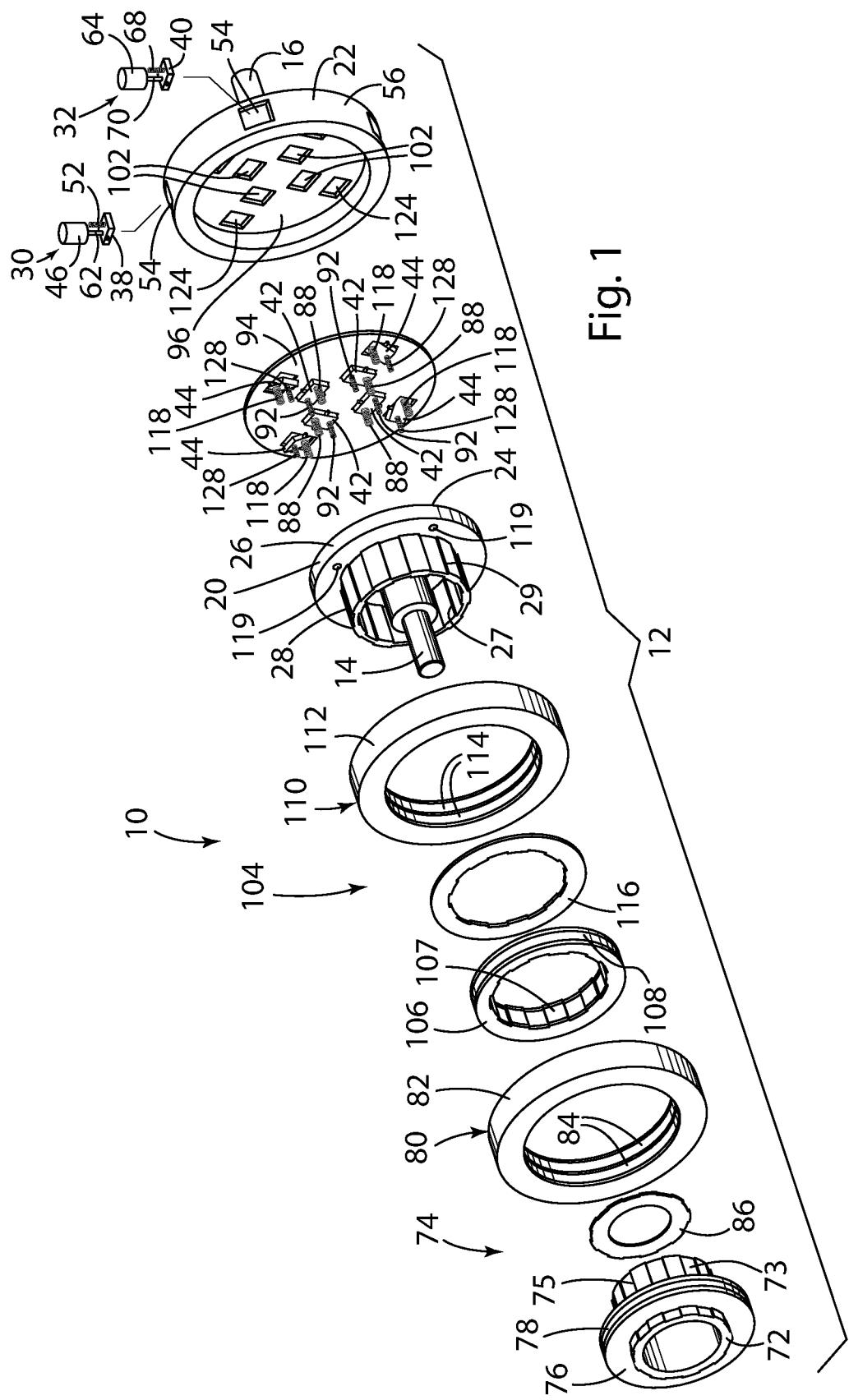
FIG. 1 is a schematic, exploded perspective view of an example of the clutch assembly or module of the present disclosure with portions removed for clarity.
Figure 2:
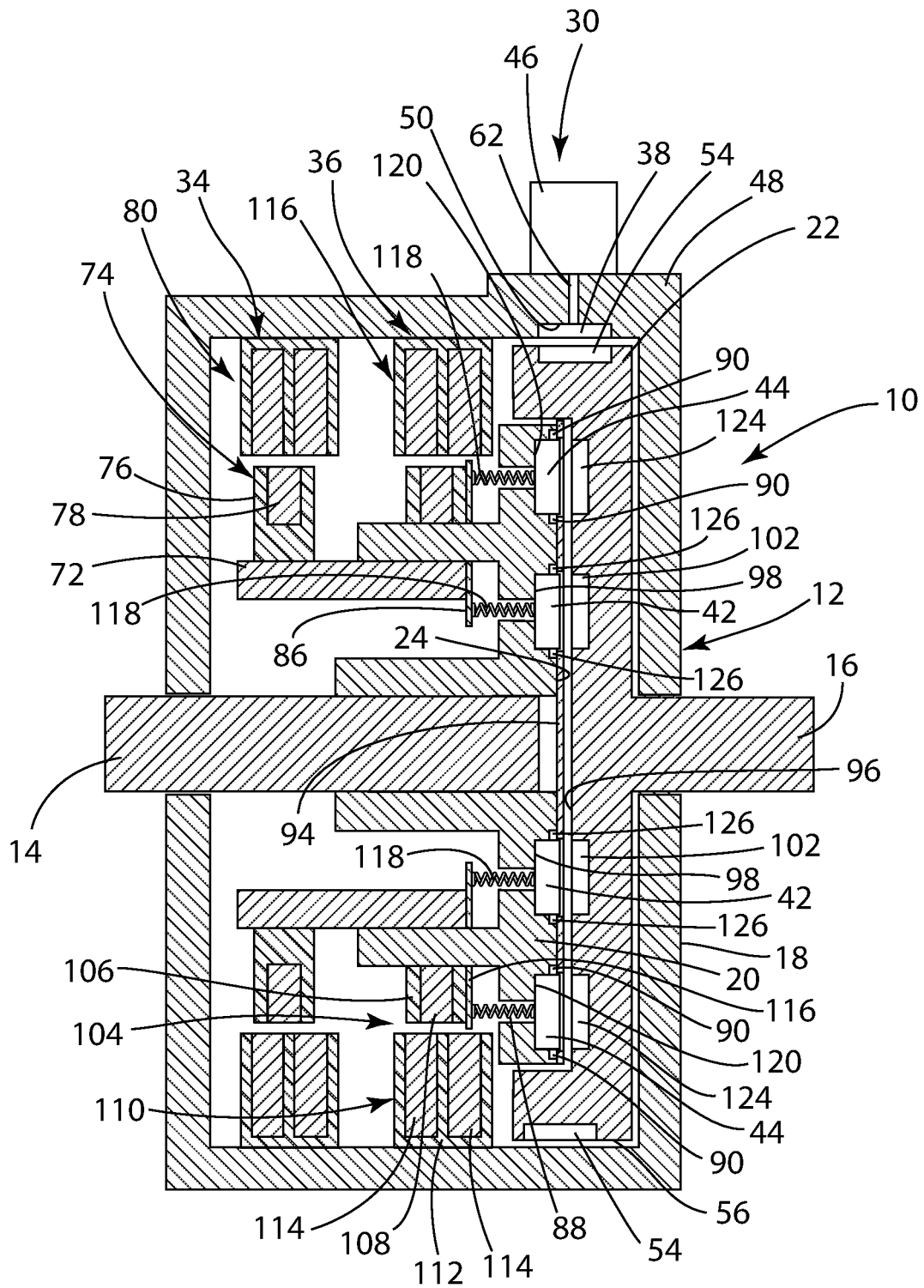
FIG. 2 is a schematic, cross-sectional side view of the clutch assembly or module or module of FIG. 1 illustrating a relationship between the components.

FIGS. 1 and 2 discloses one example of a clutch assembly or module, generally seen at 10, illustrated as a hub or wheel disconnect 12. The clutch assembly or module 10 transmits power from an input shaft 14 to an output shaft 16 or from the output shaft 16 to the input shaft 14. The clutch assembly or module 10 provides a mechanical engagement between mating parts and functions as a releasable torque transmitting mechanism. While illustrated as a hub or wheel disconnect 12, the clutch assembly or module or module 10 may be used with other mechanisms.

The hub or wheel disconnect 12 includes a housing 18, the input shaft 14 providing input, for example, from a drive motor to the hub or wheel disconnect 12, and the output shaft 16 providing an output, for example, to a vehicle wheel.

The clutch assembly or module 10 includes multiple one-way clutches. One-way clutches are capable of overrunning in one or both directions. One type of a "one-way" or "overrunning" clutch produces a drive connection (locked state) between a stationary component and a rotating component, prevents rotation of the rotating component in one direction, and overruns (freewheel state), allows rotation of the rotating component in the opposite direction. A one-way clutch mechanically couples the driving member to the driven member when the driving member rotates in a first direction relative to the driven member; otherwise, it permits the driving member to rotate freely in the second direction relative to the driven member.

Another type of a "one-way" or "overrunning" clutch produces a drive connection (locked state) between two rotating components when their relative rotation is in one direction, overruns (freewheel state) when relative rotation is in the opposite direction, and overruns (freewheel state) when their relative rotation is in the same direction when the driven member rotates faster than the drive member, or put another way the overrunning clutch operates when the drive member or input rotates slower than the driven member. The direction of driving and overrunning in the opposite direction depends upon the direction of rotation of the driving member.

A one-way clutch may be a controllable or selectable one-way clutch. The operating mode of a controllable or selectable one-way clutch can be selected or controlled whereby the selectable one-way clutch can hold torque or freewheel in one or both directions depending on the desired operating mode, for example, engaged or disengaged. As opposed to a basic one-way clutch wherein the direction of the torque being applied to the input member determines the operating mode. A selectable one-way clutch may transmit torque in one direction but not the other, for example, from an input to an output shaft but not from the output to the input shaft when the output shaft rotates in the opposite direction.

In the disclosed exemplary example, the hub assembly or wheel disconnect 12 includes the drive or input shaft 14 fixedly connected to a first coupling member, for example, a pocket plate 20. The first coupling member referred to as a pocket plate because it includes a receiving area, for example, a cavity or pocket in a surface or side face 24 of the pocket plate 20. The first coupling member may include multiple pockets 98, 120, which are circumferentially spaced. The pockets 98, 120 are sized and shaped to receive and nominally retain torque transmitting or locking members, for example the struts 42, 44. In one example, the pocket plate 20 includes an annular radially extending disc portion 26 containing the pockets 98, 120 and an axially extending cylindrical portion 28 supporting the translator assemblies 76, 106 for reciprocal, axial movement in relation to the annular radially extending disc portion 26. As used herein, radially and axially relate to the longitudinal axis or axis of rotation of the pocket plate 20 and combination or shared notch plate 22.

As illustrated in FIG. 2, the translator assembly 76 of the linear actuator 74 is fixed to a hub 72 having a cylindrical portion 73. An outer circumferential surface of the cylindrical portion 73 includes a plurality of splines 75. The splines 75 engaging corresponding splines 27 on an inner circumferential surface of the axially extending cylindrical portion 28 of the pocket plate 20. The hub 72 and translator assembly 76 rotate with, and move axially relative to, the pocket plate 20. The corresponding splines 75, 27 allow the translator assembly 74 to slide, move back and forth axially, on the axially extending cylindrical portion 28 of the pocket plate 20. The translator assembly 106 of the second linear actuator 104 includes an inner circumferential surface having a plurality of splines 107. The splines 107 engaging corresponding splines 29 on an outer circumferential surface of the axially extending cylindrical portion 28 of the pocket plate 20. The translator assembly 106 rotates with and moves axially relative to, the pocket plate 20. The corresponding splines 107, 29 allow the translator assembly 106, to slide, move back and forth axially, on the extending cylindrical portion 28 of the pocket plate 20. The splined connections connect the respective translator assemblies 76, 106 and the axially extending cylindrical portion 28 of the pocket plate 20 in a manner that allows axial movement, but prevents relative rotation between the respective components.

The assembly or module 10 also includes a second coupling member, for example, a combination or shared notch plate 22, connected to a driven or output shaft 16. The second coupling member may be referred to as a notch plate because it includes recesses or notches in at least one surface of the second coupling member. The second coupling member may include multiple recesses or notches 54, 102, 124 in multiple surfaces 56, 96 of the second coupling member. The recesses or notches 54, 102, 124 include at least one load-bearing shoulder.

The clutch assembly or module 10 includes multiple one-way clutches and, for example, may have four controllable or selectable one-way clutches.

The multiple one-way clutches 30, 32, 34, and 36 act on the combination or shared notch plate 22 connected to the output shaft 16. The multiple one-way clutches 30, 32, 34, and 36 each operate independently of the others to control torque transmission to/from and rotation, including the direction thereof, of the combination or shared notch plate 22. Multiple modes of torque transfer and rotation can be achieved depending on the position of the multiple one-way clutches 30, 32, 34, 36. The direction of rotation, clockwise or counter-clockwise, is based on the direction of rotation of the input shaft 14 and corresponding pocket plate 20.

The clutch assembly or module 10 may be referred to as a multimode clutch assembly, system, or module because it has multiple operating modes or states based on the mode or module state of each of the multiple one-way clutches. The mode or module or state of the one-way clutches may be indicated by an x/x nomenclature.

In one example, the one-way clutches are first and second controllable mechanical diode clutches (CMD) 30, 32, and first and second dynamic controllable clutches (DCC) 34, 36. Controllable mechanical diode clutch (CMD) refers to a controllable or selectable one-way clutch acting between a stationary and a rotating component, for example one race is stationary and one is rotatable. Dynamic controllable clutch refers to a controllable or selectable one-way clutch acting between two rotating components, for example both races are rotatable.

The first and second controllable mechanical diode clutches (CMD) 30, 32 connect a stationary component and a rotatable component, the connection stops or prevents rotation of the rotatable component in one direction and allows the rotatable component to overrun when the rotation is in the opposite direction. Regarding the first and second controllable mechanical diode clutches (CMD) 30, 32, the x on the left side of the slash signifies stopping or preventing rotation in the counter-clockwise direction, and the x to the right of the slash signifies stopping or preventing rotation in the clockwise direction. As used herein, a numeral one (1) on the left side of the slash indicates stopping or preventing rotation in the counter-clockwise direction. A numeral zero (0) on the left side of the slash indicates allowing rotation in the counter-clockwise direction. The same convention, either a one (1), indicating stopping or preventing rotation in the clockwise direction, or a zero (0), indicating allowing rotation in the clockwise direction, is used on the right side of the slash to signify preventing rotation or allowing rotation in the clockwise direction.

As opposed to the first and second controllable mechanical diode clutches (CMD) 30, 32, the first and second dynamic controllable clutches (DCC) 34, 36 connect rotatable components, the connection transfers torque between the rotatable components when their relative rotation is in one direction and overruns when relative rotation is in the opposite direction. The connection further producing a drive connection when their relative rotation is in one direction and overrunning when their relative rotation is in the same direction, the driven member rotates faster than the drive member. The first and second dynamically controllable clutches (DCC) 34, 36 each have two overrunning conditions. First, when relative rotation is in the opposite direction of the lock state or direction. Second, when relative rotation is in the same direction as the lock state or direction and the drive member or input rotates slower than the driven member. As for the first and second dynamic controllable clutches (DCC) 34, 36, the x on the left side of the slash signifies torque imposition in the counter-clockwise direction, and the x to the right of the slash signifies torque imposition in the clockwise direction. As used herein, a numeral one (1) on the left side of the slash indicates torque imposition in the counter-clockwise direction. A numeral zero (0) on the left side of the slash indicates no torque imposition in the counter-clockwise direction. The same convention, a one (1), indicating torque imposition in the clockwise direction, or a zero (0), indicating no torque imposition in the clockwise direction, is used on the right side of the slash to signify torque imposition or no torque imposition in the clockwise direction. The direction of torque imposition identifies the locked state or direction.

Preventing or allowing rotation of the combination or shared notch plate 22 results from engagement or nonengagement of locking elements associated with the first and second controllable mechanical diode clutches (CMD) 30, 32, and torque imposition results from engagement or nonengagement of locking elements associated with the first and second dynamic controllable clutches (DCC) 34, 36 with the combination or shared notch plate 22. The term locking element refers to a member or element capable of producing a mechanical connection. Engaged or engagement means a mechanical connection exists between two components. Nonengaged or nonengagement means no mechanical connection exists between the two components. Each of the first and second controllable mechanical diode clutches (CMD) 30, 32 and the first and second dynamic controllable clutches (DCC) 34, 36 includes a locking element that selectively mechanically couples the associated the first and second controllable mechanical diode clutches (CMD) 30, 32 and the first and second dynamic controllable clutches (DCC) 34, 36 to the combination or shared notch by 22. In one embodiment, the locking elements of the first and second controllable mechanical diode clutches (CMD) 30, 32 are pawls or struts 38, 40, and the locking elements of the first and second dynamic controllable clutches (DCC) 34, 36 are pawls or struts 42, 44.

The first controllable mechanical diode clutch (CMD) 30 stops or prevents rotation in the counter-clockwise direction. The second controllable mechanical diode clutch (CMD) 32 prevents or stops rotation in the clockwise direction. When referring to the first and second controllable mechanical diode clutches (CMD) 30, 32 and using the nomenclature, the x to the left of the slash refers to the first controllable mechanical diode clutch (CMD) 30, and the x to the right of the slash refers to the second controllable mechanical diode clutch (CMD) 32. Each of the first and second controllable mechanical diode clutches (CMD) 30, 32 has two positions. As for the first controllable mechanical diode clutch (CMD) 30, a numeral zero (0) to the left of the slash indicates nonengagement of the strut 38, and a numeral one (1) indicates engagement of the strut 38, with the combination or shared notch plate 22. Correspondingly, regarding the second controllable mechanical diode clutch (CMD) 32, a numeral zero (0) to the right of the slash indicates nonengagement of the strut 40, and a numeral one (1) indicates engagement of the strut 40, with the combination or shared notch plate 22. Using first and second controllable mechanical diode clutches (CMD) 30, 32 provides a clutch mechanism that operates in four modes: 0/0—the struts 38, 40 are both nonengaged; 1/1—the struts 38, 40 are both engaged; 0/1—strut 38 is nonengaged and strut 40 is engaged; and 1/0—strut 38 is engaged and strut 40 is nonengaged.

The first dynamic controllable clutch (DCC) 34 imposes torque in the counter-clockwise direction, and the second dynamic controllable clutch (DCC) 36 imposes torque in the clockwise direction. When referring to the first and second dynamic controllable clutches (DCC) 34, 36 and using the nomenclature, the x to the left of the slash refers to the first dynamic controllable clutch (DCC) 34, and the x to the right of the slash refers to the second dynamic controllable clutch (DCC) 36. Each of the first and second dynamic controllable clutches (CMD) 34, 36 has two positions. The numeral zero (0) indicates disengagement of the struts 42, 44, and the numeral one (1) indicates engagement of the struts 42, 44 of the first and second dynamic controllable clutches (DCC) 34, 36. Similarly, using first and second dynamic control clutches (DCC) 34, 36 provides a clutch mechanism that operates in four modes. Depending on the position of the struts 38, 40, 42, 44, for example, extended, engaged, or retracted, nonengaged, the clutch assembly or module 10 may have sixteen modes or states of operation as disclosed herein.

FIGS. 3A, 3B, 3C, and 3D show the clutch assembly or module 10 operating in a first mode, wherein the struts 38, 40 of the first and second controllable mechanical diode clutches (CMD) 30, 32, and the struts 42, 44 of the first and second dynamic controllable clutches (DCC) 34, 36 are retracted, nonengaged.

The clutch assembly or module 10 includes multiple one-way clutches, including first and second controllable mechanical diode clutches (CMD) 30, 32, and first and second dynamic controllable clutches (DCC) 34, 36. The multiple one-way clutches 30, 32, 34, and 36 act on the combination or shared notch plate 22 connected to the output shaft 16. The multiple one-way clutches 30, 32, 34, and 36 operate independently to control rotation, including the direction thereof, of the common or shared notch plate 22 and torque transmission to/from the shared notch plate 22. Depending upon the position, engaged or disengaged, of the multiple one-way clutches 30, 32, 34, 36, multiple modes of torque transfer can be achieved. The notch plate is referred to as the common or shared notch plate 22 because it is shared by the first and second controllable mechanical diode clutches (CMD) 30, 32, and first and second dynamic controllable clutches (DCC) 34, 36.

The rotation direction of the pocket plate 20, motor input, defines the direction of rotation and torque imposition. The rotation and torque transmission direction, clockwise or counter-clockwise, is based on the rotational direction of the pocket plate 20. The rotation direction stays the same regardless of whether the torque is supplied by the output shaft 16, the wheel side. Strut positions and engagement are reversed when the torque is supplied from the wheel. When used with an electric vehicle in a regeneration mode, torque supplied from the output shaft 16, the wheel side, acts through the clutch assembly or module 10 to provide input to the motor side. For example, to transfer torque in the counter-clockwise direction from the shared notch plate 22 to the pocket plate 20, the strut 44 of the second dynamic controllable clutch 36 engages the shared notch plate 22.

The first controllable mechanical diode clutch (CMD) 30 includes a solenoid 46, a CMD pocket plate 48, and a strut 38. The CMD pocket plate 48 is attached to or forms a part of the housing 18, becoming a stationary or fixed member—ground. The strut 38 disposed in a recess or pocket 50 in the CMD pocket plate 48. A spring 52 between the strut 38 and the CMD pocket plate 48 acts on the strut 38. The spring force of the spring 52 moves the strut 38 radially inward to an engaged position, wherein the strut 38 engages a notch 54 in a radially outer circumferential surface 56 of the combination or shared notch plate 22. The radially outer circumferential surface 56 of the combination or shared notch plate 22 includes a plurality of notches 54. Each notch 54 has opposite or opposed shoulder surfaces 58, 60.

In the engaged position, the strut 38 extends radially inward into a notch 54 and contacts the shoulder surface 58, and ties the combination or shared notch plate 22 to ground—for example, the CMD pocket plate 48, a stationary or fixed member typically connected to the housing 18, stopping or preventing rotation in the counter-clockwise direction.

A plunger 62 of the solenoid 46 acts on the strut 38, overcomes the spring force of and compresses the spring 52 and moves the strut 38 radially outward into a nonengaged position. The extended plunger 62 of the solenoid 46 maintains the strut 38 in a nonengaged position, in the recess or pocket 50. In the nonengaged position, the strut 38 does not extend into the notch 54 in the radially outer circumferential surface 56 of the shared notch plate 22. When the first controllable mechanical diode clutch (CMD) 30 is in the nonengaged position, the combination or shared notch plate 22 rotates freely in the counter-clockwise direction.

Like the first controllable mechanical diode clutch (CMD) 30, the second controllable mechanical diode clutch (CMD) 32 includes a solenoid 64 and strut 40. The solenoid 64 and strut 40 of the second controllable mechanical diode clutch (CMD) 32 are connected to the CMD pocket plate 48, which is attached to or forms a part of the housing 18, becoming a stationary or fixed member—ground. The strut 40 of the second controllable mechanical diode clutch (CMD) 32 is in a recess or pocket 66. Like the first controllable mechanical diode clutch (CMD) 30, the second controllable mechanical diode clutch (CMD) 32 includes a spring 68 and plunger 70 acting on the strut 40 to move and hold the strut 40 in the engaged position, wherein the strut 40 extends radially inward into a notch 54 in the combination or shared notch plate 22 and in the nonengaged position, wherein the strut 40 is in the recess or pocket 66 in the CMD pocket plate 48. In the engaged position, the strut 40 extends into a notch 54 in the radially outer circumferential surface 56 of the combination or shared notch plate 22, contacts the opposite shoulder surface 60 of the notch 54, and ties the combination or shared notch plate 22 to ground—for example, the CMD pocket plate 48, a stationary or fixed member typically connected to the housing 18, stopping or preventing rotation in the clockwise direction. When the second controllable mechanical diode clutch (CMD) 32 is in the nonengaged position, the combination or shared notch plate 22 rotates freely in the clockwise direction.

When the controllable mechanical diode clutches (CMDs) 30, 32 are each in a nonengaged position, the struts 38, 40 are in respective recesses or pockets 50, 66, and the combination or shared notch plate 22 freewheels in both directions. A freewheel condition exists when the struts are not active; that is when the struts are disengaged. An overrun condition exists when a strut is engaged; the strut stops or prevents rotation in one direction while allowing rotation in the opposite direction.

The first dynamic controllable clutch (DCC) 34 includes the pocket plate 20, a translator hub 72, and a linear actuator 74. The linear actuator 74 includes a translator assembly 76. The translator assembly 76 includes a magnet 78 and a stator assembly 80. The stator assembly 80 includes a stator core 82 and stator coils 84. The first dynamic controllable clutch (DCC) 34 includes a strut 42 and a spring plate 86. An actuation spring 88 extends through an aperture 121 in the annular radially extending disc portion 26 of the pocket plate between the spring plate 86 and the strut 42 on one side of the strut pivot arms or axis 90. A return spring 92 extends between the pocket plate 20 and the strut 42 on the opposite side of the strut pivot axis 90. The actuation spring 88 and return spring 92 engage the strut 42. A cover plate 94 covers the side face 24 of the pocket plate 20. The cover plate 94 has an opening through which the strut 42 extends.

When the linear actuator 74 moves the translator assembly 76 toward the pocket plate 20, the actuation spring 88 acts on the strut 42, overcomes the force of the return spring 92, and positions the strut 42 in an engaged position wherein the strut 42 extends out of the recess or pocket 98 of the pocket plate 20 and contacts a side or shoulder 100 of a notch 102 in a surface of the combination or shared notch plate 22, for example a side face 96 of the shared notch plate 22. In the engaged position, the first dynamic controllable clutch (DCC) 34 imposes or transmits torque in the counter-clockwise direction. When the linear actuator 74 moves the translator assembly 76 away from the pocket plate 20, the force of the return spring 92, on the opposite side of the strut pivot axis 90, acts on the strut 42 to return and hold the strut 42 in the recess or pocket 98 of the DCC pocket plate. The force of the return spring 92 holds the strut 42 in a nonengaged position, wherein the strut 42 is in the recess or pocket 98 in the pocket plate 20 and does not impose or transmit torque.

The second dynamic controllable clutch (DCC) 36 is like and operates similarly to the first dynamic controllable clutch (DCC) 34. The second dynamic controllable clutch (DCC) 36 includes a separate linear actuator 104 having a translator assembly 106, including a magnet 108, and a stator assembly 110. The stator assembly 110 includes a stator core 112 and stator coils 114. The translator assembly 106 contacts a spring plate 116. The spring plate 116 engages an actuation spring 118 that extends through an aperture 119 in the annular radially extending disc portion 26 of the pocket plate 20 and contacts the strut 44 in a recess or pocket 120 in the DCC pocket plate. Like the first dynamic controllable clutch (DCC) 34, the actuation spring 118 of the second dynamic controllable clutch (DCC) 36 acts on the strut 44, overcomes the force of a return spring 128, and positions the strut 44 in an engaged position wherein the strut 44 contacts a side or shoulder 122 of a notch 124 in the side face 96 of the shared notch plate 22. In the engaged position, the second dynamic controllable clutch (DCC) 36 imposes or transmits torque in the clockwise direction. When the linear actuator 104 moves the translator assembly 106 away from the pocket plate 20, the force of the return spring, on the opposite side of the pivot axis 126, acts on the strut 44 to return and hold the strut 44 in a nonengaged position wherein the strut 44 is in the recess or pocket 120 in the pocket plate 20 and does not impose or transmit torque.

When the dynamic controllable clutches (DCCs) 34, 36 are each in a nonengaged position, struts 42, 44 are in respective recesses or pockets 98, 120, the combination or shared notch plate 22 freewheels in both directions. A freewheel condition exists when the struts are not active; that is when the struts are disengaged. An overrun condition exists when a strut is engaged; the strut stops or prevents rotation in one direction while allowing rotation in the opposite direction.

FIGS. 3A and 3B show the first and second controllable mechanical diode clutches (CMD) 30, 32 operating in a 0/0 mode. The struts 38, 40 are each in a nonengaged position; both are in their respective pockets 50, 66, and spaced from the notches 54 in radially outer circumferential surface 56 of the combination or shared notch plate 22. Because neither of the struts 38, 40 of the controllable mechanical diode clutches (CMD) 30, 32 engage the combination or shared notch plate 22, the combination or shared notch plate 22 is not tied to ground, whereby the combination or shared notch plate 22 freewheels or rotates in both directions, counter-clockwise (CCW) and clockwise (CW) with respect to the CMD pocket plate 48.

Figure 3C:
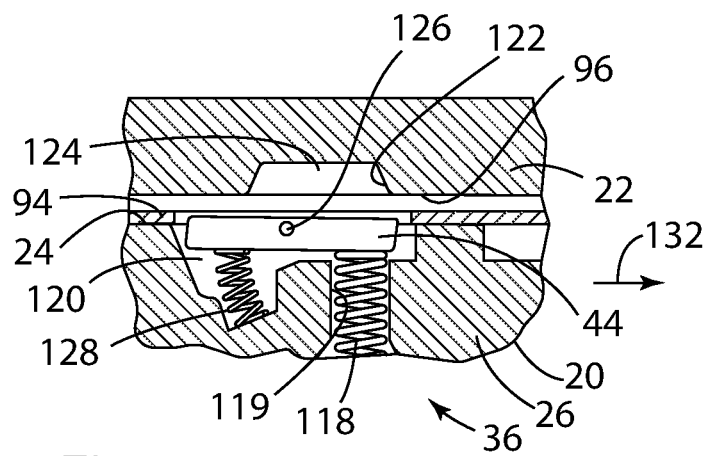
FIG. 3C is a schematic partial sectional view of one locking element.
Figure 3D:
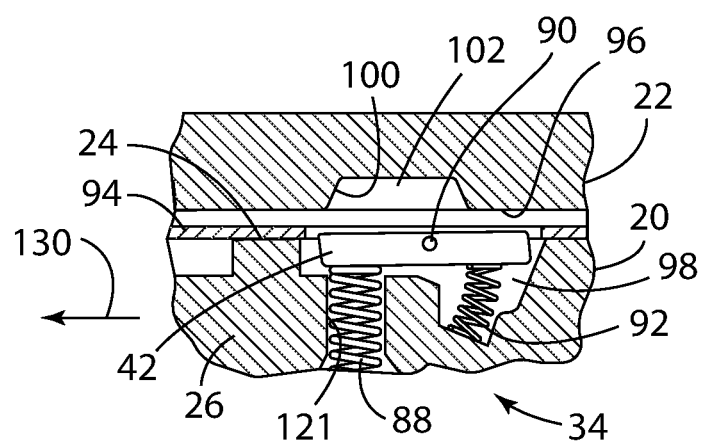
FIG. 3D is a schematic partial sectional view of an additional locking element illustrating a first mode of operation or state of the clutch assembly or module of FIGS. 1 and 2.
Figure 4C:
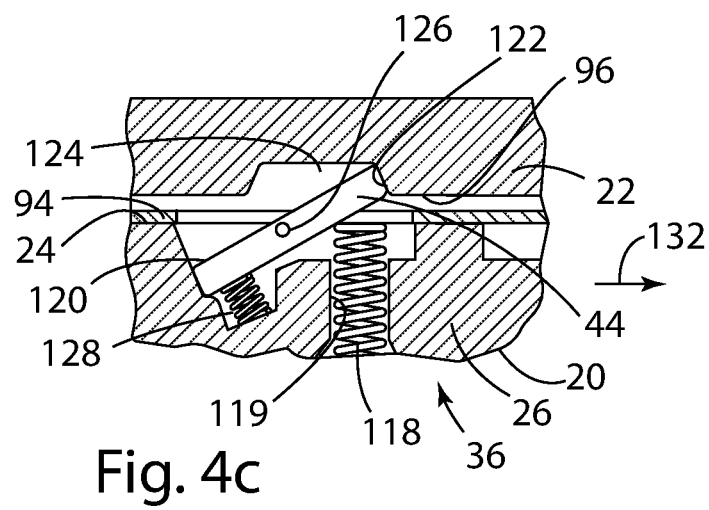
FIG. 4C is a schematic partial sectional view of one locking element.
Figure 4D:
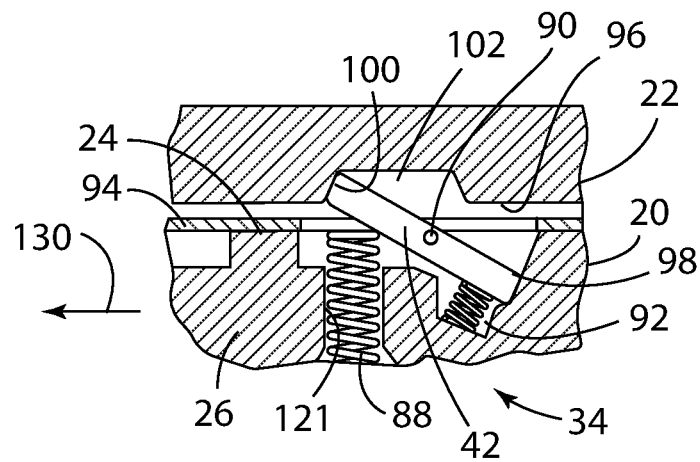
FIG. 4D is a schematic partial sectional view of an additional locking element illustrating a second mode of operation or state of the clutch assembly or module of FIGS. 1 and 2
Figure 5C:
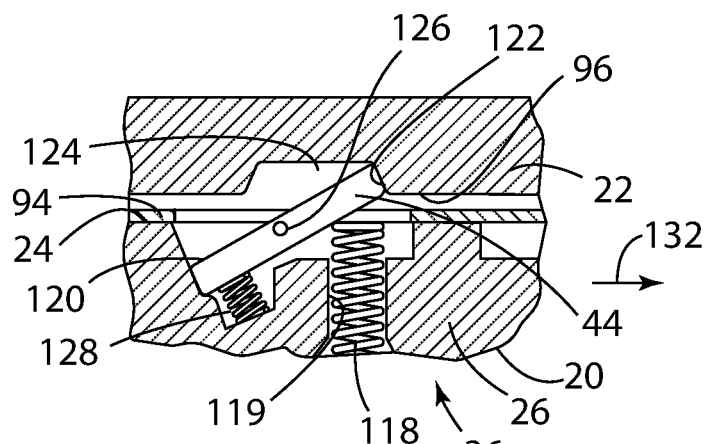
FIG. 5C is a schematic partial sectional view of one locking element.
Figure 5D:
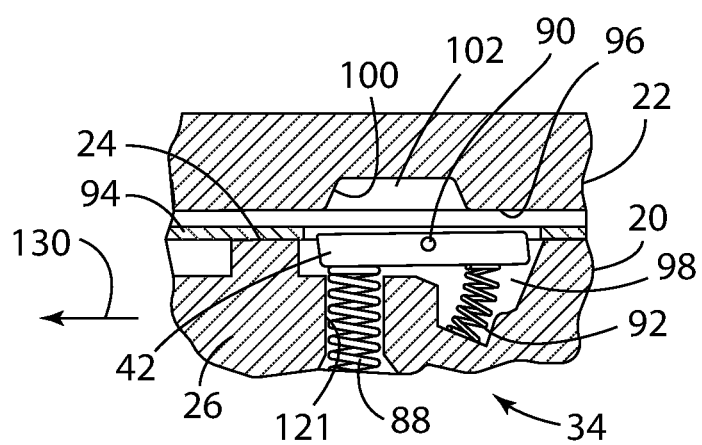
FIG. 5D is a schematic partial sectional view of an additional locking element illustrating a third mode of operation or state of the clutch assembly or module of FIGS. 1 and 2.
Figure 6C:
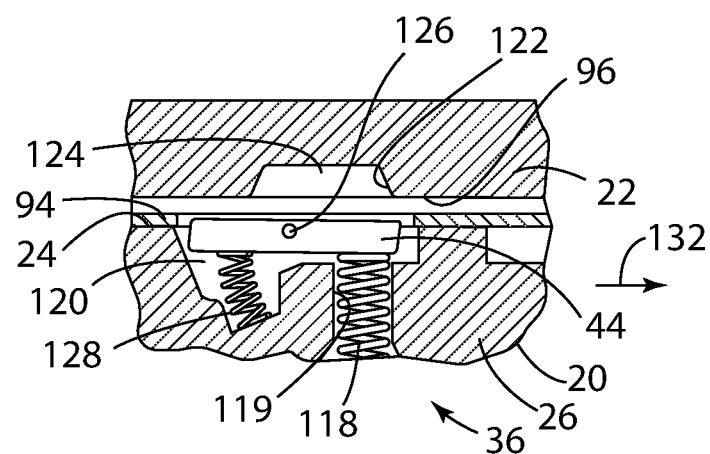
FIG. 6C is a schematic partial sectional view of one locking element.
Figure 6D:
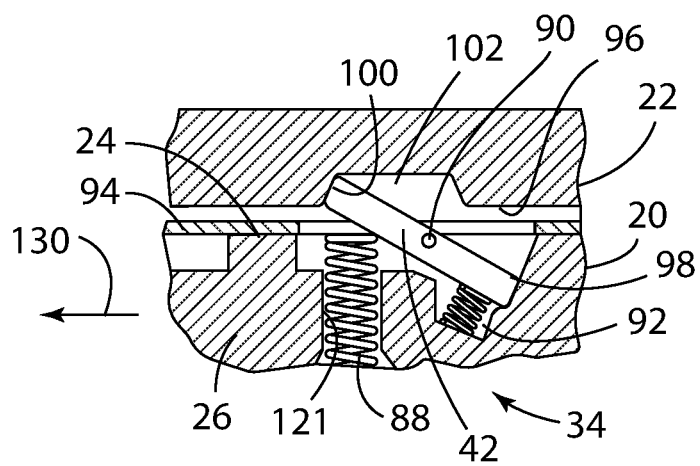
FIG. 6D is a schematic partial sectional view of an additional locking element illustrating a fourth mode of operation or state of the clutch assembly or module of FIGS. 1 and 2.
Figure 7C:
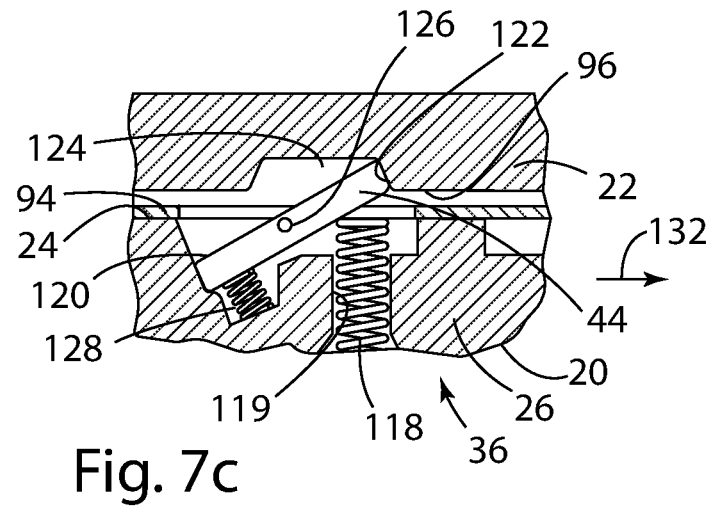
FIG. 7C is a schematic partial sectional view of one locking element.
Figure 7D:
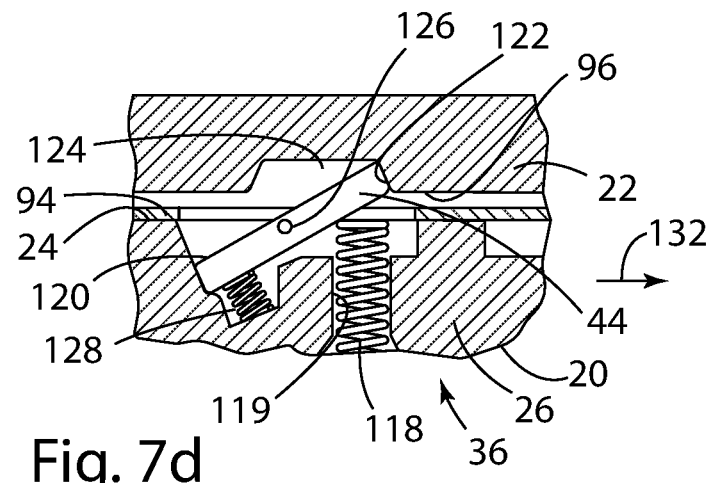
FIG. 7D is a schematic partial sectional view of an additional locking illustrating a fifth mode of operation or state of the clutch assembly or module of FIGS. 1 and 2.
Figure 8C:
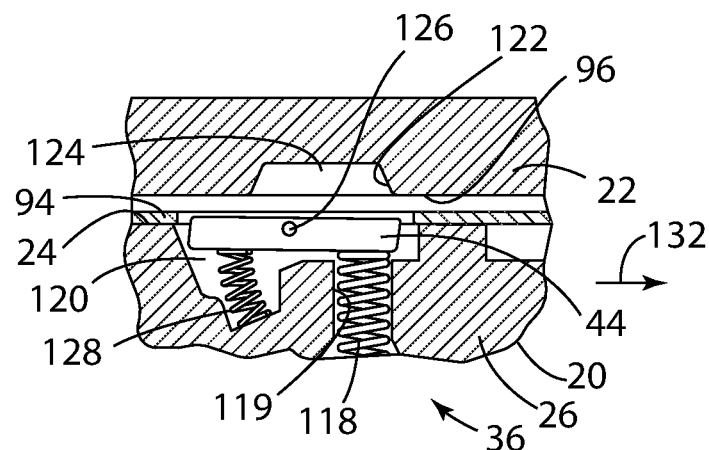
FIG. 8C is a schematic partial sectional view of one locking element.
Figure 8D:
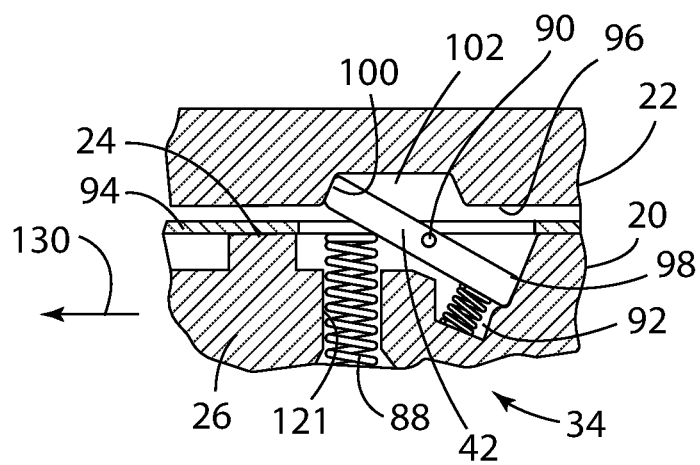
FIG. 8D is a schematic partial sectional view of an additional locking element illustrating a sixth mode of operation or state of the clutch assembly or module of FIGS. 1 and 2.
Figure 9C:
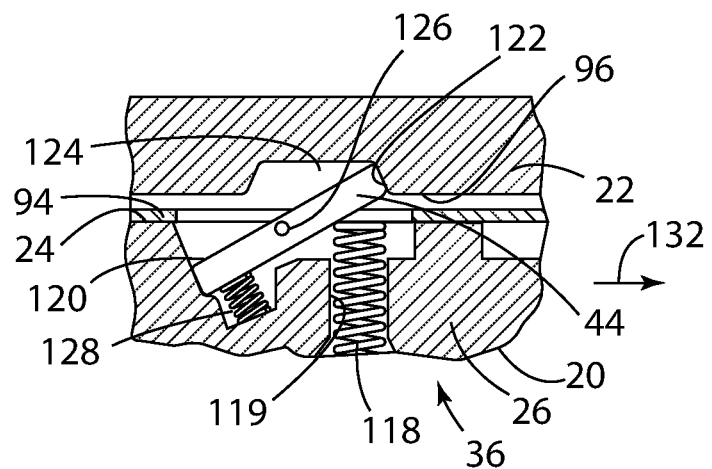
FIG. 9C is a schematic partial sectional view of one locking element.
Figure 9D:
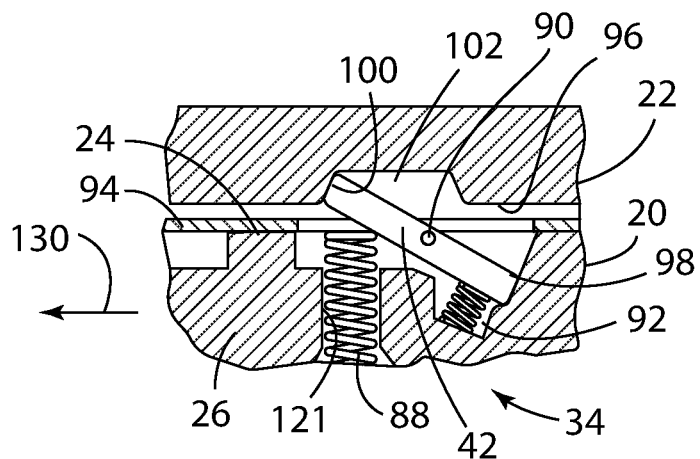
FIG. 9D is a schematic partial sectional view of an additional locking element illustrating a seventh mode of operation or state of the clutch assembly or module of FIGS. 1 and 2.
Figure 10C:
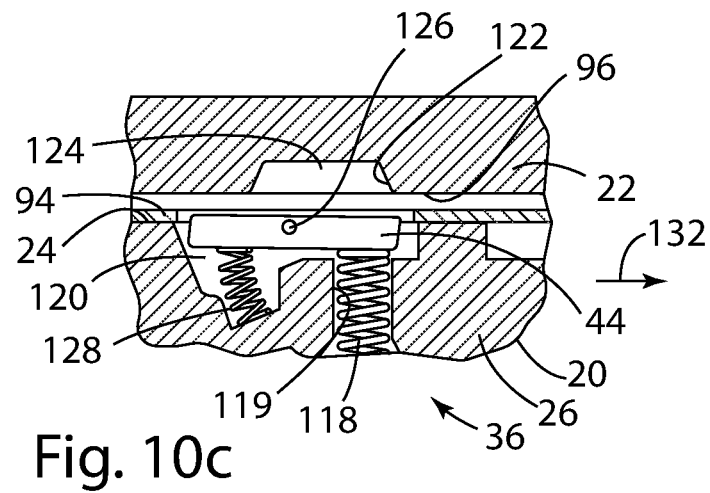
FIG. 10C is a schematic partial sectional view of one locking element.
Figure 10D:
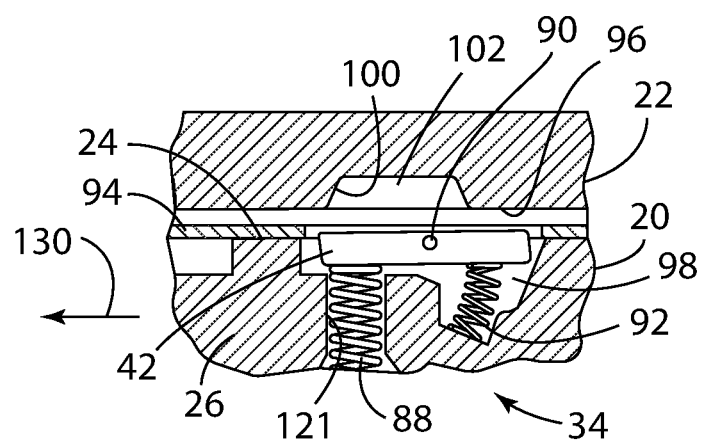
FIG. 10D is a schematic partial sectional view of an additional locking element illustrating an eighth mode of operation or state of the clutch assembly or module of FIGS. 1 and 2.
Figure 11C:
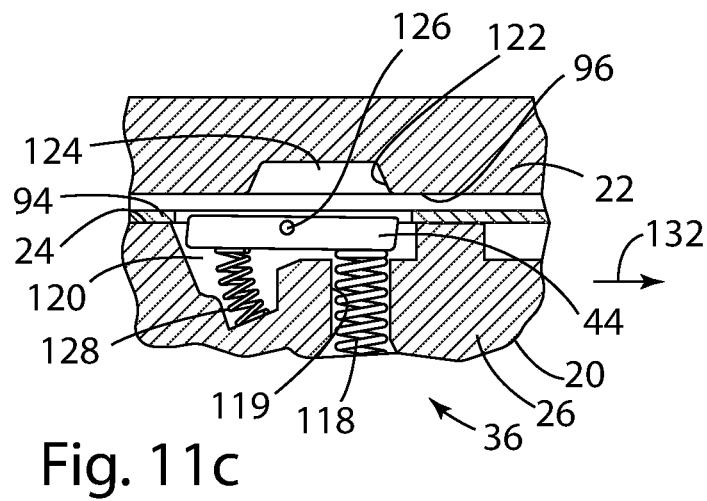
FIG. 11C is a schematic partial sectional view of one locking element.
Figure 11D:
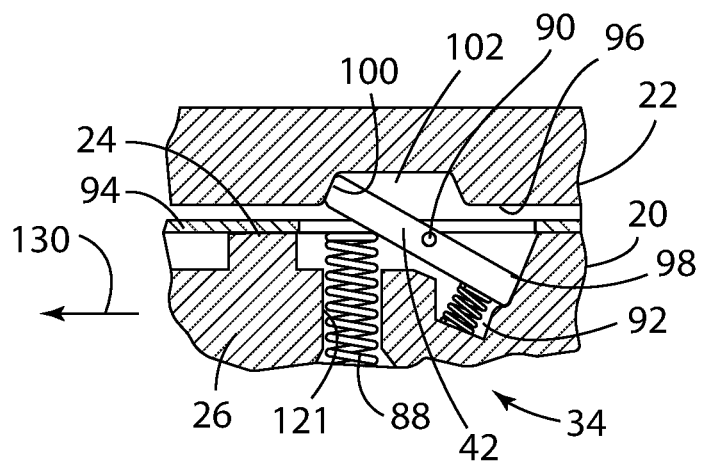
FIG. 11D is a schematic partial sectional view of an additional locking element illustrating a ninth mode of operation or state of the clutch assembly or module of FIGS. 1 and 2.
Figure 12C:
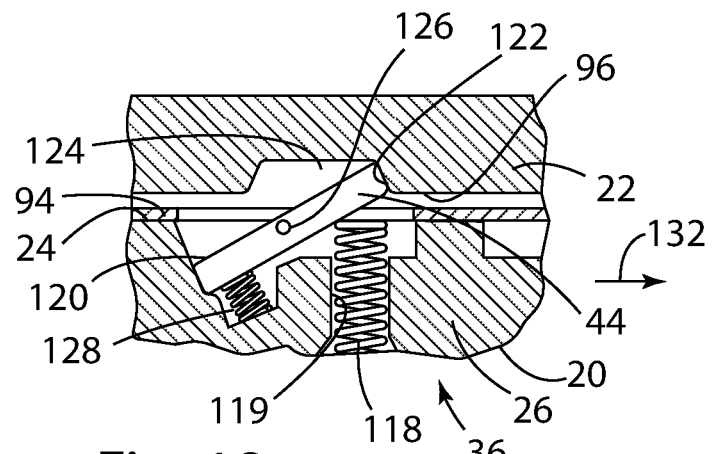
FIG. 12C is a schematic partial sectional view of one locking element.
Figure 12D:
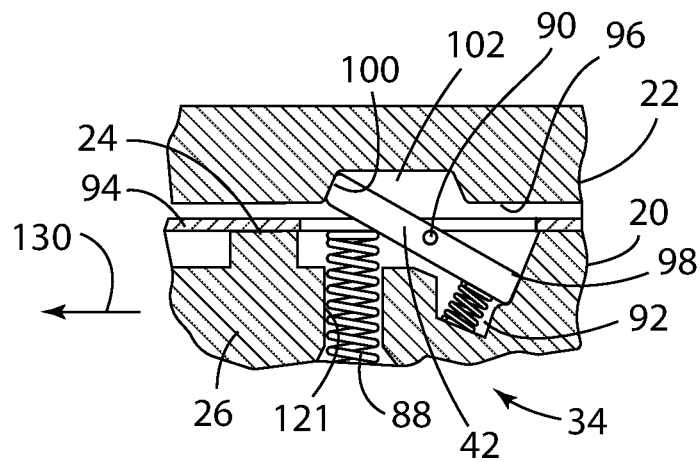
FIG. 12D is a schematic partial sectional view of an additional locking element illustrating a tenth mode of operation or state of the clutch assembly or module of FIGS. 1 and 2.
Figure 13A:
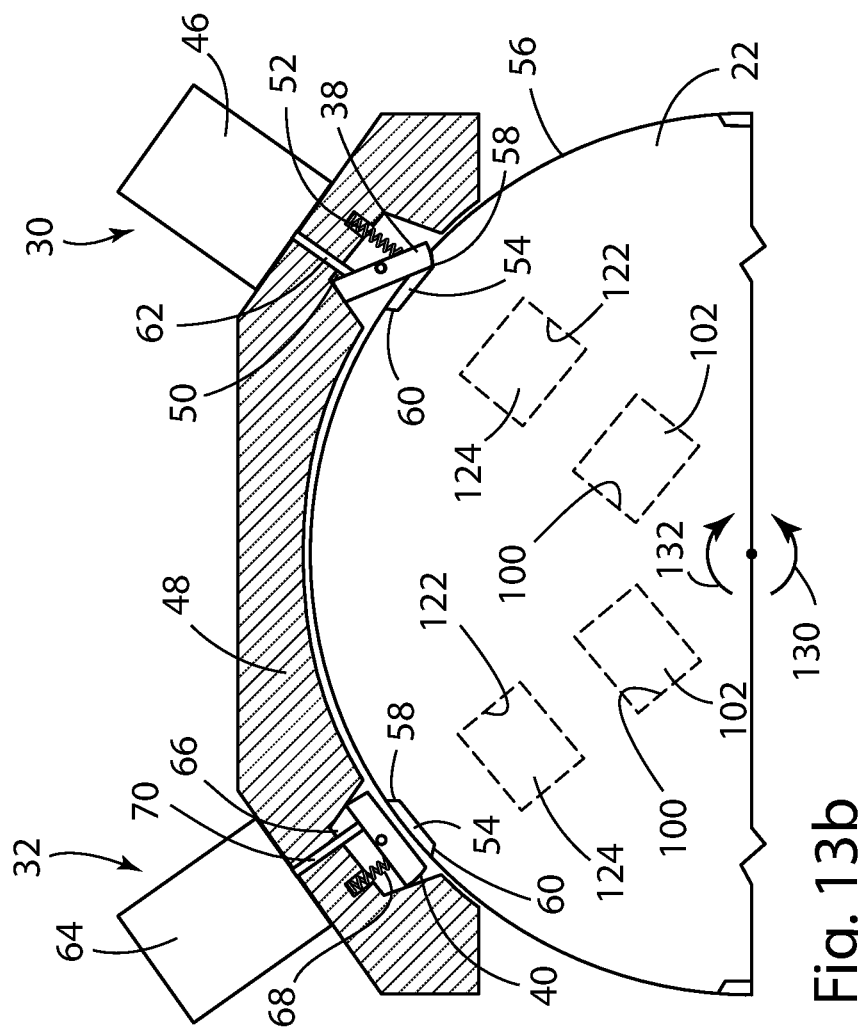
FIG. 13A is a schematic, cross-sectional, partial front view.
Figure 13B:
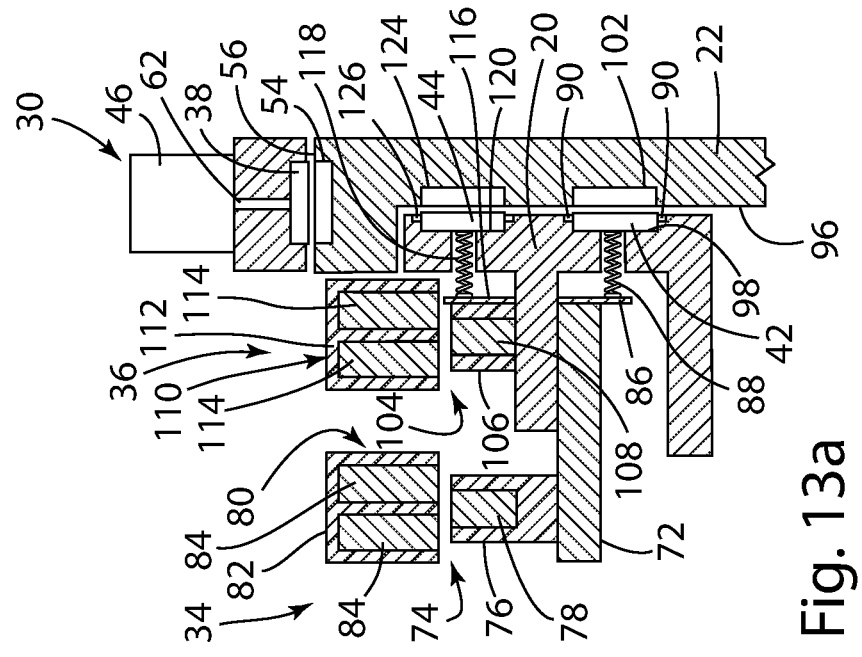
FIG. 13B is a schematic side view with a portion in section.
Figure 13C:
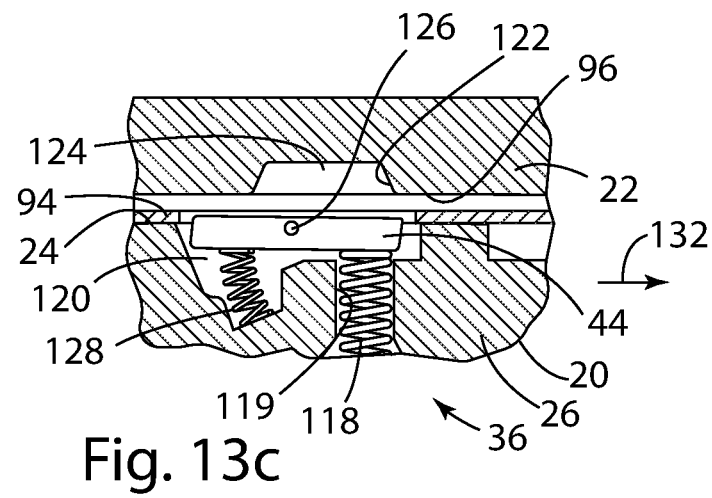
FIG. 13C is a schematic partial sectional view of one locking element.
Figure 13D:
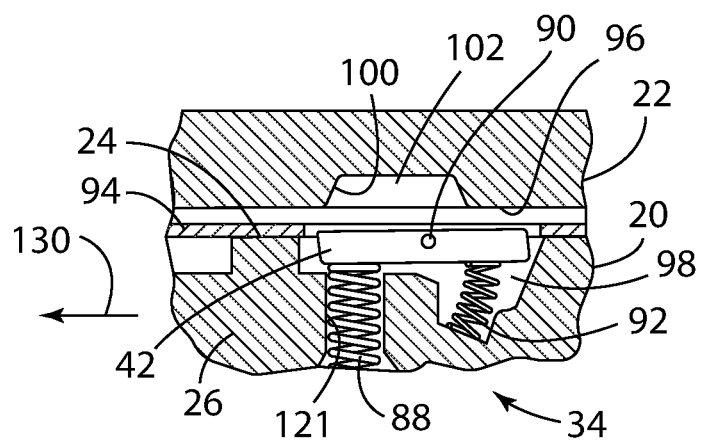
FIG. 13D is a schematic partial sectional view of an additional locking element illustrating an eleventh mode of operation or state of the clutch assembly or module of FIGS. 1 and 2.
Figure 14C:
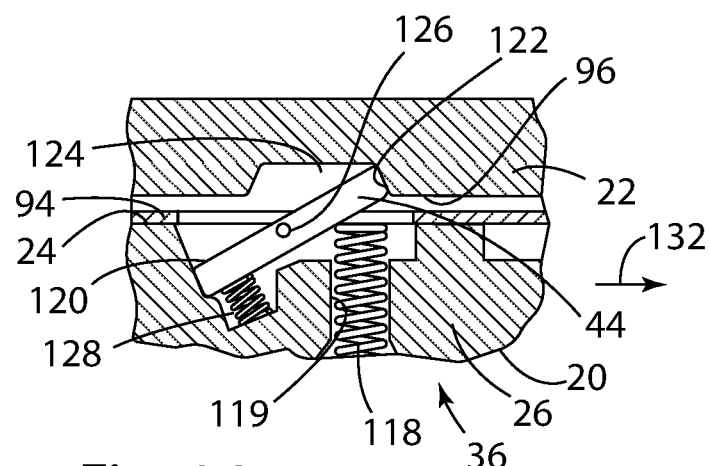
FIG. 14C is a schematic partial sectional view of one locking element.
Figure 14D:
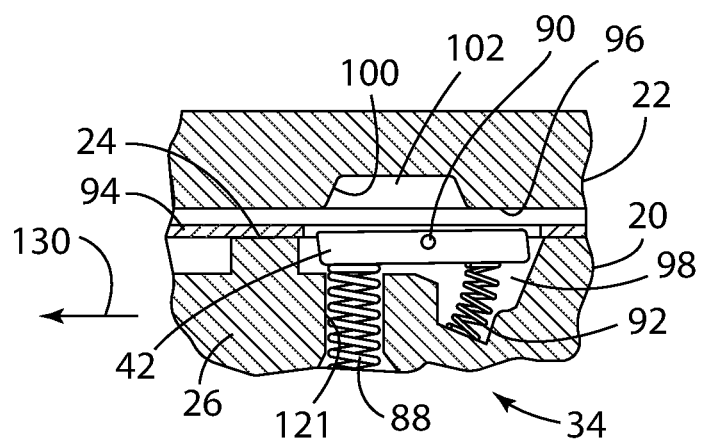
FIG. 14D is a schematic partial sectional view of an additional locking element illustrating a twelfth mode of operation or state of the clutch assembly or module of FIGS. 1 and 2.
Figure 15C:
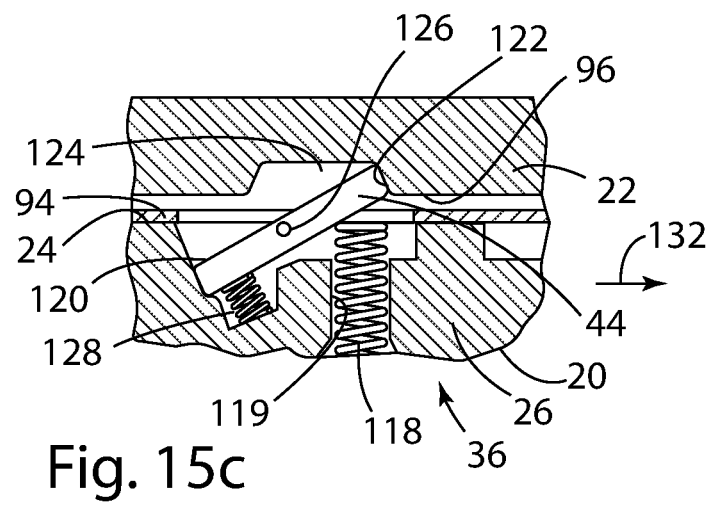
FIG. 15C is a schematic partial sectional view of one locking element.
Figure 15D:
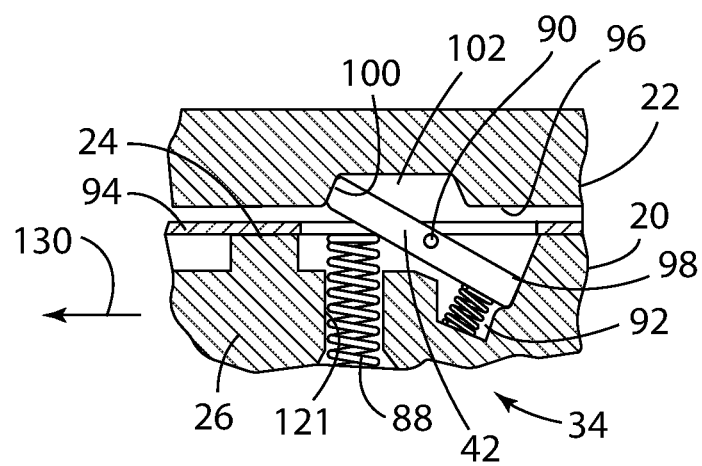
FIG. 15D is a schematic partial sectional view of an additional locking element illustrating a thirteenth mode of operation or state of the clutch assembly or module of FIGS. 1 and 2.
Figure 16C:
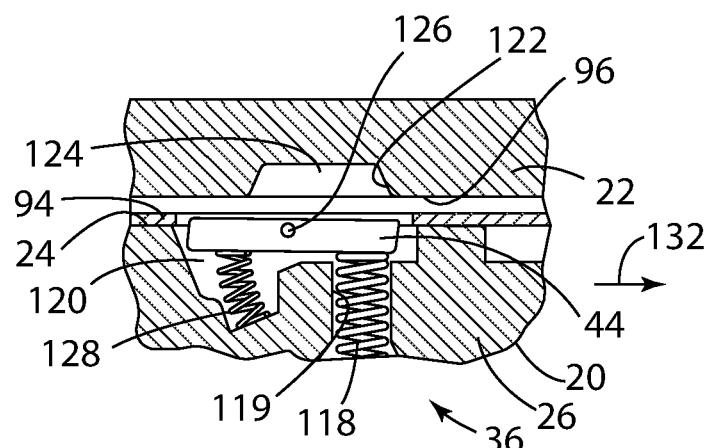
FIG. 16C is a schematic partial sectional view of one locking element.
Figure 16D:
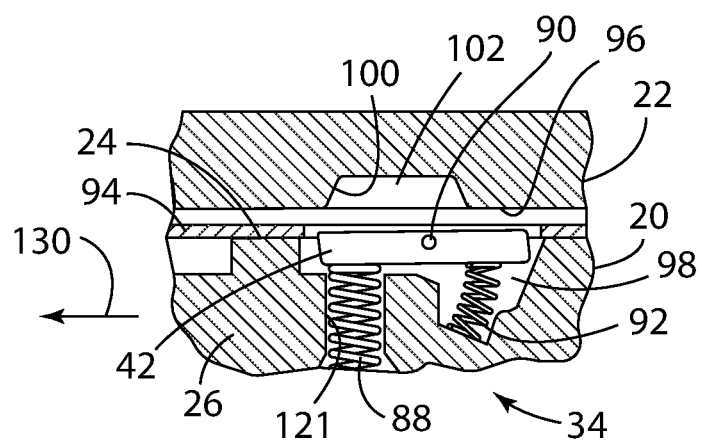
FIG. 16D is a schematic partial sectional view of an additional locking element illustrating a fourteenth mode of operation or state of the clutch assembly or module of FIGS. 1 and 2.
Figure 17C:
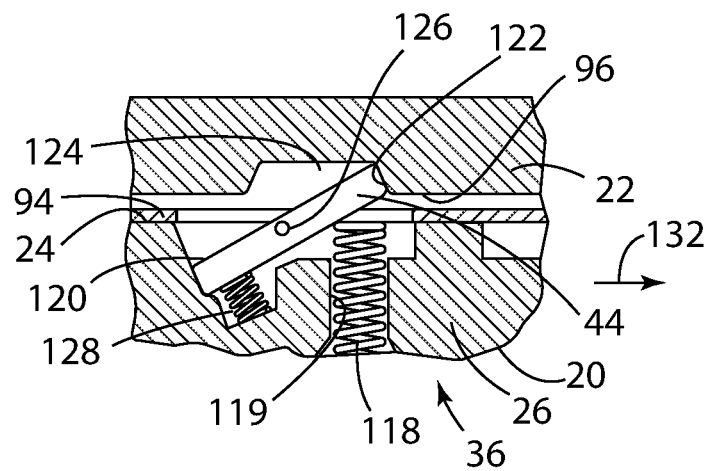
FIG. 17C is a schematic partial sectional view of one locking element.
Figure 17D:
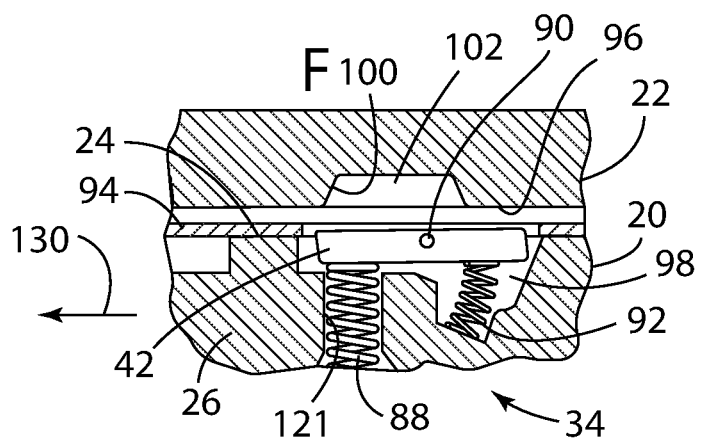
FIG. 17D is a schematic partial sectional view of an additional locking element illustrating a fifteenth mode of operation or state of the clutch assembly or module of FIGS. 1 and 2.
Figure 18C:
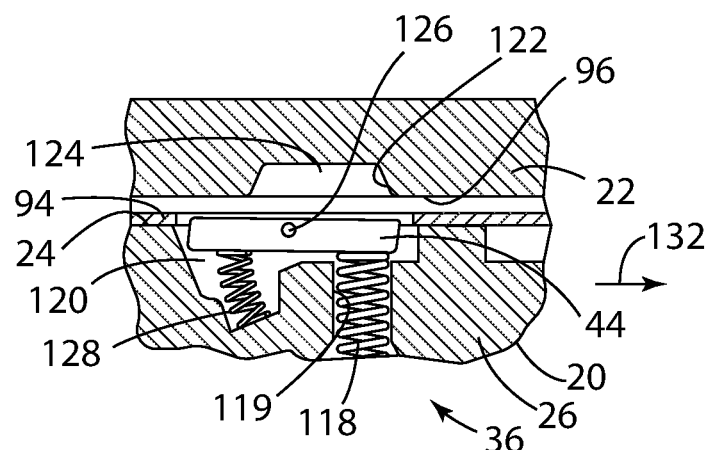
FIG. 18C is a schematic partial sectional view of one locking element.
Figure 18D:
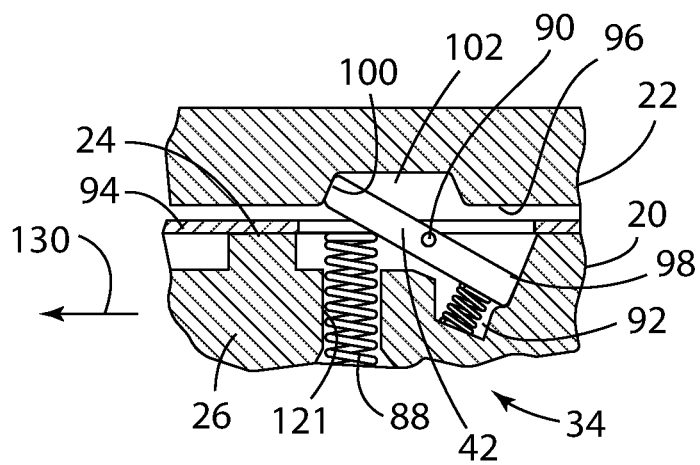
FIG. 18D is a schematic partial sectional view of an additional locking element illustrating a sixteenth mode of operation or state of the clutch assembly or module of FIGS. 1 and 2.

FIGS. 3A, 3C, and 3D show the first and second dynamic controllable clutches (DCC) 34, 36 operating in a 0/0 mode. The struts 42, 44 of the first and second dynamic controllable clutches (DCC) 34, 36 are each in a nonengaged position; both are in their respective pockets 98, 120 and spaced from respective notches 102, 124 in the side face 96 of the combination or shared notch plate 22. Because neither of the struts 42, 44 of the first and second dynamic controllable clutches (DCC) 34, 36 13 engages the combination or shared notch plate 22, no torque is imposed in either direction, counter-clockwise (CCW) or clockwise (CW), and the combination or shared notch plate 22 freewheels or rotates in both directions, counter-clockwise (CCW) and clockwise (CW) with respect to the pocket plate 20.

Because both the first and second controllable mechanical diode clutches (CMD) 30, 32 are operating in a 0/0 mode and the first and second dynamic controllable clutches (DCC) 34, 36 are operating in a 0/0 mode, the combination or shared notch plate 22 of the clutch assembly or module is free to rotate in both the clockwise and counter-clockwise directions with no tie to ground and no imposed torque.

FIGS. 3A-3D illustrate the first mode of the clutch assembly or module 10 configured as follows: controllable mechanical diodes (CMD) 0/0 and dynamic controllable clutches (DCC) 0/0. In this mode, the struts 38, 40 of the first and second controllable mechanical diode clutches (CMD) 30, 32 are nonengaged, wherein the combination or shared notch plate 22 is free to rotate in both counter-clockwise and clockwise directions, arrows 130, 132, with respect to the CMD pocket plate 48. The struts 42, 44 of the first and second dynamic controlled clutches 34, 36 are nonengaged. The pocket plate 20 transmits no torque in either direction, clockwise or counter-clockwise, because the pocket plate 20 does not engage and correspondingly transmits no torque in either direction to the combination or shared notch plate 22. The combination or shared notch plate 22 is free to rotate in the counter-clockwise and clockwise directions with respect to the pocket plate 20.

In the first mode of the clutch assembly or module 10, the combination or shared notch plate 22 is not tied to ground—CMD pocket plate 48 in either the clockwise or counter-clockwise direction; it does not stop or prevent rotation of the combination or shared notch plate 22 in either direction, and the pocket plate 20 transmits no torque to the combination or shared notch plate 22 in either the clockwise or counter-clockwise direction. The combination or shared notch plate 22 freewheels in the clockwise and counter-clockwise directions; it rotates freely in both directions.

FIGS. 4A, 4B, 4C, and 4D show the first and second controllable mechanical diode clutches (CMD) 30, 32 operating in a 1/1 mode. In a 1/1 mode, the struts 38, 40 of the first and second controllable mechanical diode clutches (CMD) 30, 32 are each in an engaged position. The struts 38, 40 extend from their respective recesses or pockets 50, 66, with each engaging a notch 54 in the radially outer circumferential surface 56 of the combination or shared notch plate 22. As shown, when the strut 38 of the first controllable mechanical diode clutch (CMD) engages the first shoulder 58 of the notch 54 in the combination or shared notch plate 22 it stops counter-clockwise rotation, arrow 130, of the combination or shared notch plate 22. When the strut 40 of the second controllable mechanical diode clutch (CMD) engages the second shoulder 60 of the notch 54 in the combination or shared notch plate 22 it stops clockwise rotation, arrow 132, of the combination or shared notch plate 22. Because both struts 38, 40 engage the combination or shared notch plate 22, they stop the rotation of the combination or shared notch plate 22 in both counter-clockwise and clockwise directions, and the combination or shared notch plate 22 remains stationary or locked in position; it does not rotate in either direction, counter-clockwise (CCW) or clockwise (CW), with respect to the CMD pocket plate 48.

FIGS. 4A, 4B, 4C, and 4D show the first and second dynamic controllable clutches (DCC) 34, 36 operating in a 1/1 mode. In a 1/1 mode, the struts 42, 44 are each in an engaged position. The struts 42, 44 extend from their respective pockets 98, 120 in the pocket plate 20, each engaging a notch 102, 124 in the side face 96 of the combination or shared notch plate 22. When the strut 42 of the first dynamic controllable clutch (DCC) 34 engages a side or shoulder 100 of the notch 102 in the combination or shared notch plate 22, it transmits torque in the counter-clockwise direction, arrow 130. When the strut 44 of the second dynamic controllable clutch (DCC) 36 engages a side or shoulder 122 of the notch 124 in the combination or shared notch plate 22, it transmits torque in the clockwise direction, arrow 132. Because both the struts 42, 44 of the first and second dynamic controllable clutches (DCC) 34, 36 engage the combination or shared notch plate 22, they transmit torque in both counter-clockwise and clockwise directions wherein the pocket plate 20 is coupled to and rotates with the combination or shared notch plate 22. Because the first and second controllable mechanical diode clutches (CMD) 30, 32 are operating in a 1/1 mode they stop the rotation of and hold the combination or shared notch plate 22 stationary, correspondingly the pocket plate 20 and the input shaft 14 are also held stationary.

FIGS. 4A-4D illustrate a second mode of the clutch assembly or module configured as follows: controllable mechanical diode clutches (CMD) 1/1 and dynamic controlled clutches (DCC) 1/1. In this mode, both the strut 40 of the second controllable mechanical diode clutch (CMD) 32 and the strut 38 of the first controllable mechanical diode clutch (CMD) 30 are engaged. The struts 42, 44 of the first and second dynamic controlled clutches (DCC) 34, 36 are engaged wherein the pocket plate 20 transmits torque in both the counter-clockwise and clockwise directions to the combination or shared notch plate 22 and the combination or shared notch plate 22 rotates with the pocket plate 20. The first controllable mechanical diode clutch (CMD) 30 stops or prevents the counter-clockwise rotation of the combination or shared notch plate 22, and the second controllable mechanical diode clutch 32 stops or prevents clockwise rotation of the combination or shared notch plate 22.

In the second mode of the clutch assembly or module 10, the combination or shared notch plate 22 is tied to ground—CMD pocket plate 48 in both the clockwise and counter-clockwise directions, stopping or preventing clockwise and counter-clockwise rotation of the combination or shared notch plate 22, and the pocket plate 20 transmits torque to the combination or shared notch plate 22 in both the counter-clockwise and clockwise directions. The combination or shared notch plate 22 transmits the clockwise and counter-clockwise torque from the pocket plate 20 to ground—CMD pocket plate 48, stopping or preventing counter-clockwise rotation of the combination or shared notch plate 22.

FIGS. 5A, 5B, 5C, and 5D show the first and second controllable mechanical diode clutches (CMD) 30, 32 operating in a 0/1 mode. The strut 38 of the first controllable mechanical diode clutch (CMD) 30 is in a nonengaged position, signified by the zero (0) to the left of the slash. The strut 38 is in the pocket 50 and spaced from the notches 54 in the radially outer circumferential surface 56 of the combination or shared notch plate 22. Because the strut 38 does not engage the combination or shared notch plate 22, the combination or shared notch plate 22 rotates, that is, freewheels, in either direction with respect to the first controllable mechanical diode clutch (CMD) 30 and CMD pocket plate 48.

However, the strut 40 of the second controllable mechanical diode clutch (CMD) 32 is in an engaged position. The strut 40 extends from the pocket 66, and the strut 40 extends radially inward into the notch 54 in an outer radial surface 56 of the combination or shared notch plate 22 and contacts the shoulder surface 60 of the notch 54. When the strut 40 contacts the shoulder surface 60, the strut 40 of the second controllable mechanical diode clutch 32 engages the combination or shared notch plate 22 and stops or prevents rotation of the combination or shared notch plate 22 in the clockwise direction, arrow 132.

Because the first and second controllable mechanical diode clutches (CMD) 30, 32 are one-way clutches, each overrun in a direction opposite to the direction of stopped or prevented rotation. For example, when engaged, the second controllable mechanical diode clutch (CMD) 32 stops or prevents rotation in the clockwise direction, arrow 132, and overruns or allows rotation of the combination or shared notch plate 22 in the counter-clockwise direction, arrow 130.

In the 0/1 mode, the first and second controllable mechanical diode clutches (CMD) 30, 32 stop rotation in the clockwise direction, arrow 132, while allowing rotation of the combination or shared notch plate 22, in the counter-clockwise direction, arrow 130.

FIGS. 5A-5D show the first and second dynamic controllable clutches (DCC) 34, 36 operating in a 0/1 mode. The strut 42 of the first dynamic controllable clutch (DCC) 34 is in a nonengaged position, signified by the zero (0) to the left of the slash. The strut 42 is in the pocket 98 and spaced from the notch 102 in the side face 96 of the combination or shared notch plate 22. Because the strut 42 does not engage the combination or shared notch plate 22, the combination or shared notch plate 22 freewheels, that is, rotates in either direction with respect to the first dynamic controllable clutch 34 and the pocket plate 20.

However, the strut 44 of the second dynamic controllable clutch (DCC) 36 extends from pocket 120 and contacts a side or shoulder 122 of a notch 124 in the side face 96 of the combination or shared notch plate 22. When the strut 44 of the first dynamic controllable clutch (DCC) 34 contacts the side or shoulder 122 of the notch 124, the strut 40 engages the combination or shared notch plate 22 and transmits torque in the clockwise direction, arrow 132.

In the 0/1 mode, the first and second dynamic controllable clutches (DCC) 34, 36 transmit torque in the clockwise direction, arrow 132, and the combination or shared notch plate 22, overruns in the counter-clockwise direction, arrow 130, and overruns in the clockwise direction when the speed of rotation of the driven member, the shared or notch plate 22 in the clockwise direction is faster than the rotational speed of the driving member, the pocket plate 20 in the clockwise direction.

In this configuration, the clutch assembly or module 10, while transmitting torque in the clockwise direction, stops rotation in the clockwise direction and overruns in the counter-clockwise direction.

FIGS. 5A-5D illustrate a third mode of the clutch assembly or module 10 configured as follows: controllable mechanical diode clutches (CMD) 0/1 and dynamic controlled clutches (DCC) 0/1. In this mode, the strut 40 of the second controllable mechanical diode clutch (CMD) 32 is engaged, and the strut 38 of the first controllable mechanical diode clutch (CMD) 30 is nonengaged with the combination or shared notch plate 22. The second controllable mechanical diode clutch 32 stops or prevents the clockwise rotation of the combination or shared notch plate 22, and the combination or shared notch plate 22 overruns in the counter-clockwise direction. The strut 42 of the first dynamic controlled clutch (DCC) 34 is nonengaged and the strut 44 of the second dynamic controlled clutch (DCC) 36 is engaged, wherein the pocket plate 20 transmits torque in the clockwise direction to the combination or shared notch plate 22, overruns the combination or shared notch plate 22 in the counter-clockwise direction, and the combination or shared notch plate 22 overruns the pocket plate 20 in the clockwise direction when the speed of rotation $\omega_{22}$ of the driven member, combination or shared notch plate 22, in the clockwise direction is faster than the rotational speed w 20 of the driving member, the pocket plate 20, in the clockwise direction.

In the third mode of the clutch assembly or module 10, the combination or shared notch plate 22 is tied to ground—CMD pocket plate 48 in the clockwise direction, stopping or preventing clockwise rotation of the combination or shared notch plate 22, and the pocket plate 20 transmits torque to the combination or shared notch plate 22 in the clockwise direction. The combination or shared notch plate 22 transmits the clockwise torque from the pocket plate 20 to ground—CMD pocket plate 48. The combination or shared notch plate 22 overruns the second controllable mechanical diode clutch 32 in the counter-clockwise direction, and the pocket plate 20 overruns the combination or shared notch plate 22 in the counter-clockwise direction based on relative speed ($\omega_{20} > \omega_{22}$). Either instance requires a torque difference or directional torque change. For example, if the torque from the combination or shared notch plate 22 in the counter-clockwise direction exceeds the clockwise torque from the pocket plate 20, the combination or shared notch plate 22 will overrun the CMD and rotate counter-clockwise when the speed $\omega_{22}$ of the combination or shared notch plate 22 is greater than zero ($\omega_{22} > 0$). Should the torque direction change, for example, the pocket plate 20 now rotates counter-clockwise, the notch plate 22 may also rotate counter-clockwise. In this condition, the pocket plate 20 will overrun the combination or shared notch plate 22 in the counter-clockwise direction as long as the pocket plate 20 rotates at a faster speed relative to the combination or shared notch plate 22 ($\omega_{20} > \omega_{22}$).

FIGS. 6A, 6B, 6C, and 6D show the first and second controllable mechanical diode clutches (CMD) 30, 32 operating in a 1/0 mode. The strut 40 of the second controllable mechanical diode clutch (CMD) 32 is in a nonengaged position, signified by the zero (0) to the right of the slash. The strut 40 is in the pocket 50 and spaced from the notches 54 in the radially outer circumferential surface 56 of the combination or shared notch plate 22. Because the strut 40 does not engage the combination or shared notch plate 22, the combination or shared notch plate 22 rotates in either direction with respect to the second controllable mechanical diode clutch (CMD) 32 and the CMD pocket plate 48.

However, the strut 38 of the first controllable mechanical diode clutch (CMD) 32 is in an engaged position. The strut 38 extends from the pocket 50, and the strut 38 extends radially inward into the notch 54 in an outer radial surface 56 of the combination or shared notch plate 22 and contacts the shoulder surface 58 of the notch 54. When the strut 38 of the first controllable mechanical diode clutch 30 engages the combination or shared notch plate 22, it stops or prevents rotation of the combination or shared notch plate 22 in the counter-clockwise direction, arrow 130.

Because the first and second controllable mechanical diode clutches (CMD) 30, 32 are one-way clutches, they each overrun in a direction opposite to the direction of rotation stoppage or prevention. For example, when engaged, the first controllable mechanical diode clutch (CMD) 30 stops rotation in the counter-clockwise direction, arrow 130, and overruns, or allows rotation of, the combination or shared notch plate 22 in the clockwise direction, arrow 132.

In the 1/0 mode, the first and second controllable mechanical diode clutches (CMD) 30, 32 stop rotation in the counter-clockwise direction, arrow 130, while overrunning, allowing rotation of the combination or shared notch plate 22, in the clockwise direction, arrow 132.

FIGS. 6A, 6B, 6C, and 6D show the first and second dynamic controllable clutches (DCC) 34, 36 operating in a 1/0 mode. The strut 44 of the second dynamic controllable clutch (DCC) 36 is in a nonengaged position, signified by the zero (0) to the right of the slash. The strut 44 is in the pocket 120 and spaced from a notch 124 in the side face 96 of the combination or shared notch plate 22. Because the strut 44 does not engage the combination or shared notch plate 22, the combination or shared notch plate 22 rotates in either direction with respect to the first dynamic controllable clutch 34 and the pocket plate 20.

However, the strut 42 of the first dynamic controllable clutch (DCC) 34 extends from the pocket 98 and engages a side or shoulder 100 of a notch 102 in the side face 96 of the combination or shared notch plate 22. When the strut 42 of the first dynamic controllable clutch (DCC) 34 engages the combination or shared notch plate 22, it transmits torque in the counter-clockwise direction, arrow 130.

In the 1/0 mode, the first and second dynamic controllable clutches (DCC) 34, 36 transmit torque in the counter-clockwise direction, arrow 130. The combination or shared notch plate 22 overruns in the clockwise direction, arrow 132, and overruns in the counter-clockwise direction when the speed of rotation of the driven member, shared or notch plate 22, in the counter-clockwise direction, is faster than the rotational speed of the driving member, pocket plate 20 in the counter-clockwise direction.

In this configuration, the clutch assembly or module 10, while transmitting torque in the counter-clockwise direction, stops rotation in the counter-clockwise direction and overruns in the clockwise direction.

FIGS. 6A-6D illustrate a fourth mode of the clutch assembly or module 10 configured as follows: controllable mechanical diode clutches (CMD) 1/0 and dynamic controlled clutches (DCC) 1/0. In this mode, the strut 40 of the second controllable mechanical diode clutch (CMD) 32 is nonengaged, and the strut 38 of the first controllable mechanical diode clutch (CMD) 30 is engaged with the combination or shared notch plate 22. The first controllable mechanical diode clutch (CMD) 30 stops or prevents the counter-clockwise rotation of the combination or shared notch plate 22, and the combination or shared notch plate 22 overruns in the clockwise direction. The strut 42 of the first dynamic controlled clutch (DCC) 34 is engaged and the strut 44 of the second dynamic controlled clutch (DCC) 36 is nonengaged, wherein the pocket plate 20 transmits torque in the counter-clockwise direction to the combination or shared notch plate 22, overruns the combination or shared notch plate 22 in the clockwise direction, and overruns in the counter-clockwise direction when the speed of rotation $\omega_{22}$ of the driven member, shared or notch plate 22, in the counter-clockwise direction, is faster than the rotational speed $\omega_{20}$ of the driving member, pocket plate 20, in the counter-clockwise direction In the fourth mode of the clutch assembly or module 10, the combination or shared notch plate 22 is tied to ground—CMD pocket plate 48 in the counter-clockwise direction, stopping or preventing counter-clockwise rotation of the combination or shared notch plate 22, and the pocket plate 20 transmits torque to the combination or shared notch plate 22 in the counter-clockwise direction. The combination or shared notch plate 22 transmits the counter-clockwise torque from the pocket plate 20 to ground—CMD pocket plate 48. The pocket plate 20 overruns the combination or shared notch plate 22 in the clockwise direction, and the combination or shared notch plate 22 overruns the CMD pocket plate 48 in the clockwise direction based on relative speed ($\omega_{20} > \omega_{22}$). Either instance requires a torque difference or directional torque change. For example, if the torque from the combination or shared notch plate 22 in the clockwise direction exceeds the counter-clockwise torque from the pocket plate 20, the combination or shared notch plate 22 will overrun the CMD pocket plate 48 and rotate clockwise when the speed $\omega_{22}$ of the combination or shared notch plate 22 is greater than zero ($\omega_{22} > 0$). Should the torque direction change, for example, the pocket plate 20 now rotates clockwise, the combination or shared notch plate 22 may also rotate clockwise. In this condition, the pocket plate 20 will overrun the combination or shared notch plate 22 in the clockwise direction as long as the pocket plate 20 rotates at a faster speed relative to the combination or shared notch plate 22 ($\omega_{20} > \omega_{22}$).

FIGS. 7A, 7B, 7C, and 7D illustrate a fifth mode of the clutch assembly or module 10 configured as follows: dynamic controlled clutches (DCC) 0/1 and controllable mechanical diode clutches (CMD) 0/0. In this mode, the strut 42 of the first dynamic controlled clutch (DCC) 34 is nonengaged and the strut 44 of the second dynamic controlled clutch (DCC) 36 is engaged, wherein the pocket plate 20 transmits torque in the clockwise direction to the combination or shared notch plate 22, overruns the combination or shared notch plate 22 in the counter-clockwise direction, and the combination or shared notch plate 22 overruns the pocket plate 20 in the clockwise direction when the speed of rotation $\omega_{22}$ of the driven member, shared or notch plate 22, in the clockwise direction is faster than the rotational speed $\omega_{20}$ of the driving member, pocket plate 20 in the clockwise direction. The struts 38, 40 of the first and second controllable mechanical diode clutches (CMD) 30, 32 are nonengaged, wherein the combination or shared notch plate 22 is free to rotate in both counter-clockwise and clockwise directions with respect to the CMD pocket plate 48.

In the fifth mode of the clutch assembly or module 10, because the combination or shared notch plate 22 is not tied to ground—CMD pocket plate 48 in either the clockwise or counter-clockwise direction, it does not stop or prevent rotation of the combination or shared notch plate 22 in either direction. The pocket plate 20 transmits torque to the combination or shared notch plate 22 in the clockwise direction. The combination or shared notch plate 22 transmits the clockwise torque from the pocket plate 20 and the combination or shared notch plate 22 overruns the pocket plate 20 in the clockwise direction based on relative speed ($\omega_{22}>\omega_{20}$) The pocket plate 20 overruns the combination or shared notch plate 22 in the counter-clockwise direction based on a torque and direction change; for example, if the pocket plate 20 rotates counter-clockwise, the combination or shared notch plate 22 may also rotate counter-clockwise. In this condition, the pocket plate 20 will overrun the combination or shared notch plate 22 in the counter-clockwise direction as long as the pocket plate 20 rotates at a faster speed relative to the combination or shared notch plate 22 ($\omega_{20}>\omega_{22}$).

FIGS. 8A, 8B, 8C, and 8D illustrate a sixth mode of the clutch assembly or module configured as follows: dynamic controlled clutches (DCC) 1/0 and controllable mechanical diode clutches (CMD) 0/0. In this mode the strut 42 of the first dynamic controlled clutch (DCC) 34 is engaged and the strut 44 of the second dynamic controlled clutch (DCC) 36 is nonengaged, wherein the pocket plate 20 transmits torque in the counter-clockwise direction to the combination or shared notch plate 22, overruns the combination or shared notch plate 22 in the clockwise direction, and the combination or shared notch plate 22 overruns the pocket plate 20 in the counter-clockwise direction when the speed of rotation $\omega_{22}$ of the driven member, combination shared or notch plate 22, in the counter-clockwise direction is faster than the rotational speed $\omega_{20}$ of the driving member, pocket plate 20 in the counter-clockwise direction. The struts 38, 40 of the first and second controllable mechanical diode clutches (CMD) 30, 32 are nonengaged, wherein the combination or shared notch plate 22 is free to rotate in both counter-clockwise and clockwise directions with respect to the CMD pocket plate 48.

In the sixth mode of the clutch assembly or module 10, the combination or shared notch plate 22 is not tied to ground—CMD pocket plate 48 in either the clockwise or counter-clockwise direction, it does not stop or prevent rotation of the combination or shared notch plate 22 in either direction, and the pocket plate 20 transmits torque to the combination or shared notch plate 22 in the counter-clockwise direction. The combination or shared notch plate 22 transmits the counter-clockwise torque from the pocket plate 20 and the combination or shared notch plate 22 overruns the pocket plate 20 in the counter-clockwise direction based on relative speed, for example, when the speed of the combination or shared notch plate 22 is greater than the speed of the pocket plate 20 ($\omega_{22}>\omega_{20}$). The combination or shared notch plate 22 overruns the pocket plate 20 in the clockwise direction based on a torque and direction change; for example, if the pocket plate 20 now rotates clockwise, the combination or shared notch plate 22 may also rotate clockwise. In this condition, the pocket plate 20 will overrun the combination or shared notch plate 22 in the clockwise direction as long as the pocket plate 20 rotates at a faster speed relative to the combination or shared notch plate 22 ($\omega_{20}>\omega_{22}$).

FIGS. 9A, 9B, 9C, and 9D illustrate a seventh mode of the clutch assembly or module 10 configured as follows: dynamic controlled clutches (DCC) 1/1 and controllable mechanical diode clutches (CMD) 0/0. In this mode, the struts 42, 44 of the first and second dynamic controlled clutches (DCC) 34, 36 are engaged wherein the pocket plate 20 transmits torque in both the counter-clockwise and clockwise directions to the combination or shared notch plate 22 and combination or shared notch plate 22 rotates with the pocket plate 20. The struts 38, 40 of the first and second controllable mechanical diode clutches (CMD) 30, 32 are nonengaged, wherein the combination or shared notch plate 22 is free to rotate in both counter-clockwise and clockwise directions with respect to the CMD pocket plate 8.

In the seventh mode of the clutch assembly or module 10, the combination or shared notch plate 22 is not tied to ground—CMD pocket plate 48 in either the clockwise or counter-clockwise direction, it does not stop or prevent rotation of the combination or shared notch plate 22 in either direction, and the pocket plate 20 transmits torque to the combination or shared notch plate 22 in both the counter-clockwise and clockwise directions. The combination or shared notch plate 22 transmits torque in either the clockwise or counter-clockwise direction.

FIGS. 10A, 10B, 10C, and 10D illustrate an eighth mode of the clutch assembly or module 10 configured as follows: dynamic controlled clutches (DCC) 0/0 and controllable mechanical diode clutches (CMD) 0/1. In this mode, the struts 38, 40 of both the first and second dynamic controlled clutches 34, 36 are nonengaged. The combination or shared notch plate 22 is free to rotate in the counter-clockwise and clockwise directions with respect to the pocket plate 20 because the pocket plate 20 does not engage and correspondingly transmits no torque in either direction to the combination or shared notch plate 22. The strut 40 of the second controllable mechanical diode clutch (CMD) 32 is engaged, and the strut 38 of the first controllable mechanical diode clutch (CMD) 30 is nonengaged with the combination or shared notch plate 22. The second controllable mechanical diode clutch 32 stops or prevents the clockwise rotation of the combination or shared notch plate 22, and the combination or shared notch plate 22 overruns in the counter-clockwise direction.

In the eighth mode of the clutch assembly or module 10, the combination or shared notch plate 22 is tied to ground—CMD pocket plate 48 in the clockwise direction, stopping or preventing clockwise rotation of the combination or shared notch plate 22, and the pocket plate 20 transmits no torque to the combination or shared notch plate 22 in either the clockwise or counter-clockwise direction. The combination or shared notch plate 22 is stopped or prevented from rotating in the clockwise direction and the combination or shared notch plate 22 overruns the CMD pocket plate 48 in the counter-clockwise direction when $\omega_{22}$ is greater than zero ($\omega_{22>0}$). Because neither strut 42, 44 of the pocket plate 20 is engaged, the pocket plate 20 freewheels with respect to the combination or shared notch plate 22.

FIGS. 11A, 11B, 11C, and 11D illustrate a ninth mode of the clutch assembly or module 10 configured as follows: dynamic controlled clutches (DCC) 1/0 and controllable mechanical diode clutches (CMD) 0/1. In this mode the strut 42 of the first dynamic controlled clutch (DCC) 34 is engaged and the strut 44 of the second dynamic controlled clutch (DCC) 36 is nonengaged, wherein the pocket plate 20 transmits torque in the counter-clockwise direction to the combination or shared notch plate 22, overruns the combination or shared notch plate 22 in the clockwise direction, and the combination or shared notch plate 22 overruns the pocket plate 20 in the counter-clockwise direction when the speed of rotation $\omega_{22}$ of the driven member, combination or shared notch plate 22, in the counter-clockwise direction is faster than the rotational speed $\omega_{20}$ of the driving member, the pocket plate 20, in the counter-clockwise direction. The strut 40 of the second controllable mechanical diode clutch (CMD) 32 is engaged, and the strut 38 of the first controllable mechanical diode clutch (CMD) 30 is nonengaged with the combination or shared notch plate 22. The second controllable mechanical diode clutch 32 stops or prevents the clockwise rotation of the combination or shared notch plate 22, and the combination or shared notch plate 22 overruns in the counter-clockwise direction.

In the ninth mode of the clutch assembly or module 10, the combination or shared notch plate 22 is tied to ground—CMD pocket plate 48 in the clockwise direction, stopping or preventing clockwise rotation of the combination or shared notch plate 22, and the pocket plate 20 transmits torque to the combination or shared notch plate 22 in the counter-clockwise direction. The combination or shared notch plate 22 transmits the counter-clockwise torque from the pocket plate 20. The pocket plate 20 overruns the combination or shared notch plate 22 in the clockwise direction, the combination or shared notch plate 22 overruns the pocket plate 20 in the counter-clockwise direction based on relative speed ($\omega_{22} > \omega_{20}$), and the combination or shared notch plate 22 is stopped or prevented from rotating clockwise.

FIGS. 12A, 12B, 12C, and 12D illustrate a tenth mode of the clutch assembly or module configured as follows: dynamic controlled clutches (DCC) 1/1 and controllable mechanical diode clutches (CMD) 0/1. In this mode, the struts 42, 44 of the first and second dynamic controlled clutches (DCC) 34, 36 are engaged wherein the pocket plate 20 transmits torque in both the counter-clockwise and clockwise directions to the combination or shared notch plate 22 and combination or shared notch plate 22 rotates with the pocket plate 20. The strut 40 of the second controllable mechanical diode clutch (CMD) 32 is engaged, and the strut 38 of the first controllable mechanical diode clutch (CMD) 30 is nonengaged with the combination or shared notch plate 22. The second controllable mechanical diode clutch 32 stops or prevents the clockwise rotation of the combination or shared notch plate 22, and the combination or shared notch plate 22 overruns in the counter-clockwise direction.

In the tenth mode of the clutch assembly or module 10, the combination or shared notch plate 22 is tied to ground—CMD pocket plate 48 in the clockwise direction, stopping or preventing clockwise rotation of the combination or shared notch plate 22, and the pocket plate 20 transmits torque to the combination or shared notch plate 22 in both the counter-clockwise and clockwise directions. The combination or shared notch plate 22 transmits the counter-clockwise torque from the pocket plate 20 and transmits the counter-clockwise torque from the pocket plate 20 to ground—CMD pocket plate 48. The combination or shared notch plate 22 rotates in the counter-clockwise direction when the counter-clockwise torque applied by the combination or shared notch plate 22 exceeds any clockwise torque applied by the pocket plate 20. When the torque from the combination or shared notch plate 22 in the counter-clockwise direction exceeds the clockwise torque from the pocket plate 20, the combination or shared notch plate 22 will overrun the CMD pocket plate 48 and rotate counter-clockwise.

FIGS. 13A, 13B, 13C, and 13D illustrate an eleventh mode of the clutch assembly or module 10 configured as follows: dynamic controlled clutches (DCC) 0/0 and controllable mechanical diode clutches (CMD) 1/0. In this mode, the struts 42, 44 of both the first and second dynamic controlled clutches 34, 36 are nonengaged, wherein the combination or shared notch plate 22 is free to rotate in both counter-clockwise and clockwise directions with respect to the pocket plate 20 because the pocket plate 20 does not engage and correspondingly transmits no torque in either direction to the combination or shared notch plate 22. The strut 40 of the second controllable mechanical diode clutch (CMD) 32 is nonengaged, and the strut 38 of the first controllable mechanical diode clutch (CMD) 30 is engaged with the combination or shared notch plate 22. The first controllable mechanical diode clutch (CMD) 30 stops or prevents the counter-clockwise rotation of the combination or shared notch plate 22, and the combination or shared notch plate 22 overruns in the clockwise direction.

In the eleventh mode of the clutch assembly or module 10, the combination or shared notch plate 22 is tied to ground—CMD pocket plate 48 in the counter-clockwise direction, stopping or preventing counter-clockwise rotation of the combination or shared notch plate 22, and the pocket plate 20 transmits no torque to the combination or shared notch plate 22 in either the clockwise or counter-clockwise direction. The combination or shared notch plate 22 is stopped or prevented from rotating in the counter-clockwise direction and the combination or shared notch plate 22 overruns the CMD pocket plate 48 in the clockwise direction when $\omega_{22}$ is greater than zero in the clockwise direction. ($\omega_{22>0}$). Because neither strut 42, 44 of the pocket plate 20 is engaged, the pocket plate 20 freewheels with respect to the combination or shared notch plate 22.

FIGS. 14A, 14B, 14C, and 14D illustrate a twelfth mode of the clutch assembly or module configured as follows: dynamic controlled clutches (DCC) 0/1 and controllable mechanical diode clutches (CMD) 1/0. In this mode, the strut 42 of the first dynamic controlled clutch (DCC) 34 is nonengaged and the strut 44 of the second dynamic controlled clutch (DCC) 36 is engaged, wherein the pocket plate 20 transmits torque in the clockwise direction to the combination or shared notch plate 22, overruns the combination or shared notch plate 22 in the counter-clockwise direction, and the combination or shared notch plate 22 overruns the pocket plate 20 in the clockwise direction when the speed of rotation $\omega_{22}$ of the driven member, combination or shared notch plate 22, in the clockwise direction is faster than the rotational speed $\omega_{20}$ of the driving member, pocket plate 20, in the clockwise direction. The strut 40 of the second controllable mechanical diode clutch (CMD) 32 is nonengaged, and the strut 38 of the first controllable mechanical diode clutch (CMD) 30 is engaged with the combination or shared notch plate 22. The first controllable mechanical diode clutch (CMD) 30 stops or prevents the counter-clockwise rotation of the combination or shared notch plate 22, and the combination or shared notch plate 22 overruns in the clockwise direction.

In the twelfth mode of the clutch assembly or module 10, the combination or shared notch plate 22 is tied to ground—CMD pocket plate 48 in the counter-clockwise direction, stopping or preventing counter-clockwise rotation of the combination or shared notch plate 22, and the pocket plate 20 transmits torque to the combination or shared notch plate 22 in the clockwise direction. The combination or shared notch plate 22 transmits the clockwise torque from the pocket plate 20, the pocket plate 20 overruns the combination or shared notch plate 22 in the counter-clockwise direction, the combination or shared notch plate 22 overruns the pocket plate 20 in the clockwise direction based on relative speed ($\omega_{22}$>$\omega_{20}$), and the combination or shared notch plate 22 is stopped or prevented from rotating counter-clockwise.

FIGS. 15A, 15B, 15C, and 15D illustrate a thirteenth mode of the clutch assembly or module 10 configured as follows: dynamic controlled clutches (DCC) 1/1 and controllable mechanical diode clutches (CMD) 1/0. In this mode, the struts 42, 44 of the first and second dynamic controlled clutches (DCC) 34, 36 are engaged wherein the pocket plate 20 transmits torque in both the counter-clockwise and clockwise directions to the combination or shared notch plate 22 and combination or shared notch plate 22 rotates with the pocket plate 20. The strut 40 of the second controllable mechanical diode clutch (CMD) 32 is nonengaged, and the strut 38 of the first controllable mechanical diode clutch (CMD) 30 is engaged with the combination or shared notch plate 22. The first controllable mechanical diode clutch (CMD) 30 stops or prevents the counter-clockwise rotation of the combination or shared notch plate 22, and the combination or shared notch plate 22 overruns in the clockwise direction.

In the thirteenth mode of the clutch assembly or module 10, the combination or shared notch plate 22 is tied to ground—CMD pocket plate 48 in the counter-clockwise direction, stopping or preventing counter-clockwise rotation of the combination or shared notch plate 22, and the pocket plate 20 transmits torque to the combination or shared notch plate 22 in both the counter-clockwise and clockwise directions. The combination or shared notch plate 22 transmits the clockwise torque from the pocket plate 20 and transmits the counter-clockwise torque from the pocket plate 20 to ground—CMD pocket plate 48. The combination or shared notch plate 22 rotates in the clockwise direction when the clockwise torque applied by the combination or shared notch plate 22 exceeds any counter-clockwise torque applied by the pocket plate 20. When the torque from the combination or shared notch plate 22 in the clockwise direction exceeds the counter-clockwise torque from the pocket plate 20, the combination or shared notch plate 22 will overrun the CMD pocket plate 48 and rotate clockwise.

FIGS. 16A, 16B, 16C, and 16D illustrate a fourteenth mode of the clutch assembly or module configured as follows: dynamic controlled clutches (DCC) 0/0 and controllable mechanical diode clutches (CMD) 1/1. In this mode, the struts 42, 44 of both the first and second dynamic controlled clutches 34, 36 are nonengaged, wherein the combination or shared notch plate 22 is free to rotate in both counter-clockwise and clockwise directions with respect to the pocket plate 20 because the pocket plate 20 does not engage and correspondingly transmits no torque in either direction to the combination or shared notch plate 22. The strut 40 of the second controllable mechanical diode clutch (CMD) 32 and the strut 38 of the first controllable mechanical diode clutch (CMD) 30 are engaged. The first controllable mechanical diode clutch (CMD) 30 stops or prevents counter-clockwise rotation of the combination or shared notch plate 22, and the second controllable mechanical diode clutch (CMD) 32 stops or prevents clockwise rotation of the combination or shared notch plate 22.

In the fourteenth mode of the clutch assembly or module 10, the combination or shared notch plate 22 is tied to ground—CMD pocket plate 48 in both the clockwise and counter-clockwise directions, stopping or preventing clockwise and counter-clockwise rotation of the combination or shared notch plate 22, and the pocket plate 20 transmits no torque to the combination or shared notch plate 22 in either the clockwise or counter-clockwise direction. The combination or shared notch plate 22 is tied to ground—CMD pocket plate 48 in both the clockwise and counter-clockwise directions, stopping or preventing both clockwise and counter-clockwise rotation of the combination or shared notch plate 22. The pocket plate 20 freewheels with respect to the combination or shared notch plate 22 based on relative speed, for example, when the speed of the pocket plate 20 is greater than the speed of the combination or shared notch plate 22 ($\omega_{20}$>$\omega_{22}$). Because the combination or shared notch plate 22 is tied to ground—CMD pocket plate 48, the relative speed of the pocket plate 20 will always be greater than that of the combination or shared notch plate 22.

FIGS. 17A, 17B, 17C, and 17D illustrate a fifteenth mode of the clutch assembly or module configured as follows: dynamic controlled clutches (DCC) 0/1 and controllable mechanical diode clutches (CMD) 1/1. In this mode, the strut 42 of the first dynamic controlled clutch (DCC) 34 is nonengaged and the strut 44 of the second dynamic controlled clutch (DCC) 36 is engaged, wherein the pocket plate 20 transmits torque in the clockwise direction to the combination or shared notch plate 22, overruns the combination or shared notch plate 22 in the counter-clockwise direction, and the combination or shared notch plate 22 overruns the pocket plate 20 in the clockwise direction when the speed of rotation $\omega_{22}$ of the driven member, combination or shared notch plate 22, in the clockwise direction is faster than the rotational speed $\omega_{20}$ of the driving member, the pocket plate 20, in the clockwise direction. The strut 40 of the second controllable mechanical diode clutch (CMD) 32 and the strut 38 of the first controllable mechanical diode clutch (CMD) 30 are engaged, wherein the first controllable mechanical diode clutch (CMD) 30 stops or prevents the counter-clockwise rotation of the combination or shared notch plate 22, and the second controllable mechanical diode clutch (CMD) 32 stops or prevents clockwise rotation of the combination or shared notch plate 22.

In the fifteenth mode of the clutch assembly or module 10, the combination or shared notch plate 22 is tied to ground—CMD pocket plate 48 in the clockwise and counter-clockwise directions, stopping or preventing clockwise and counter-clockwise rotation of the combination or shared notch plate 22. The pocket plate 20 transmits torque to the combination or shared notch plate 22 in the clockwise direction. The combination or shared notch plate 22 transmits the clockwise torque from the pocket plate 20 to ground—CMD pocket plate 48, which stops or prevents counter-clockwise rotation of the combination or shared notch plate 22. The pocket plate 20 overruns the combination or shared notch plate 22 in the counter-clockwise direction, FIGS. 18A, 18B, 18C, and 18D illustrate a sixteenth mode of the clutch assembly or module configured as follows: dynamic controlled clutches (DCC) 1/0 and controllable mechanical diode clutches (CMD) 1/1. In this mode the strut 42 of the first dynamic controlled clutch (DCC) 34 is engaged and the strut 44 of the second dynamic controlled clutch (DCC) 36 is nonengaged, wherein the pocket plate 20 transmits torque in the counter-clockwise direction to the combination or shared notch plate 22, overruns the combination or shared notch plate 22 in the clockwise direction, and the combination or shared notch plate 22 overruns the pocket plate 20 in the counter-clockwise direction when the speed of rotation $\omega_{22}$ of the driven member, combination or shared notch plate 22, in the counter-clockwise direction is faster than the rotational speed $\omega_{20}$ of the driving member, the pocket plate 20, in the counter-clockwise direction. The strut 40 of the second controllable mechanical diode clutch (CMD) 32 and the strut 38 of the first controllable mechanical diode clutch (CMD) 30 are engaged. Wherein the first controllable mechanical diode clutch (CMD) 30 stops or prevents the counter-clockwise rotation of the combination or shared notch plate 22, and the second controllable mechanical diode clutch (CMD) 32 stops or prevents clockwise rotation of the combination or shared notch plate 22.

In the sixteenth mode of the clutch assembly or module 10, the combination or shared notch plate 22 is tied to ground—CMD pocket plate 48 in both the clockwise and counter-clockwise directions, stopping or preventing clockwise and counter-clockwise rotation of the combination or shared notch plate 22. The pocket plate 20 transmits torque to the combination or shared notch plate 22 in the counter-clockwise direction. The combination or shared notch plate 22 transmits the counter-clockwise torque from the pocket plate 20 to ground—CMD pocket plate 48, which stops or prevents the clockwise rotation of the combination or shared notch plate 22. The pocket plate 20 overruns the combination or shared notch plate 22 in the clockwise direction, FIGS. 19A and 19B show an alternative embodiment of the clutch assembly or module 10. The first and second controllable mechanical diode clutches (CMD) 30, 32 are adjacent to a side face 134 of the combination or shared notch plate 22. Instead of engaging notches in the radially outer circumferential surface 56 of the combination or shared notch plate 22, the struts 38, 40 of the first and second controllable mechanical diode clutches (CMD) 30, 32 engage notches 136 in the side face 134 of the combination or shared notch plate 22. The struts 42, 44 of the first and second dynamic controlled clutches (DCC) 34, 36 engage the opposing side face 96 of the combination or shared notch plate 22. While shown on opposing side faces 134, 96 of the combination or shared notch plate 22, the first and second controllable mechanical diode clutches (CMD) 30, 32 and the first and second dynamic controlled clutches (DCC) 34, 36 may be on the same side of the combination or shared notch plate 22. The dynamically controlled clutches (DCC) 34, 36 and the controllable mechanical diode clutches (CMD) 30, 32 are all planar; they engage respective side faces 96, 134 of the combination or shared notch plate 22.

FIGS. 19A and 19B illustrate a mode of the clutch assembly or module 10 configured as follows: dynamic controlled clutches (DCC) 1/1 and controllable mechanical diode clutches (CMD) 1/1. FIG. 19B shows the struts 38, 40 in the pockets 135 with the solenoids 46, 64 and CMD pocket plate 48 removed for illustration. This is one example of a mode of the clutch assembly or module 10. The clutch assembly or module 10 illustrated in FIGS. 19A and 19B, like the previously disclosed example, also has up to sixteen modes of operation.

FIGS. 20A and 20B show another alternative embodiment of the clutch assembly or module 10. The first and second dynamic controlled clutches 34, 36 act on an inner radial surface 140 of the combination or shared notch plate 22. The struts 42, 44 of the first and second dynamic controlled clutches (DCC) 34, 36 extend radially outward and engage notches 142 in the inner radial surface 140. The first and second controllable mechanical diode clutches (CMD) 30, 32 engage notches 54 in the outer radial surface 56 of the combination or shared notch plate 22. As shown, the dynamically controlled clutches (DCC) 34, 36 and the controllable mechanical diode clutches (CMD) 30, 32 are all radial, the respective struts 38, 40, 42, 44 extend radially and engage a radially outer circumferential surface 56 or a radially inner circumferential surface 140 of the combination or shared notch plate 22. Each translator assembly 76, 106 includes a rod or plunger having a conically shaped cam 144. The respective translator assemblies 76, 106 are spaced circumferentially from one another about the cylindrical portion 28 and move independently of one another. The conically shaped cam 144 of the translator assembly 76 contacts strut 42 and the conically shaped cam 144 of the translator assembly 106 contacts strut 44. The surface of the conically shaped cam 144 contacts the strut, wherein axial movement of the cam 144 pushes the strut, against the spring 88, 118 to a nonengaged position.

FIGS. 20A and 20B illustrate a mode of the clutch assembly or module 10 configured as follows: dynamic controlled clutches (DCC) 1/1 and controllable mechanical diode clutches (CMD) 1/1. This is but one example of a mode of the clutch assembly or module 10. The clutch assembly or module 10 illustrated in FIGS. 20A and 20B, like the previously disclosed example, also has up to sixteen modes of operation.

Figures 21A, 21B:
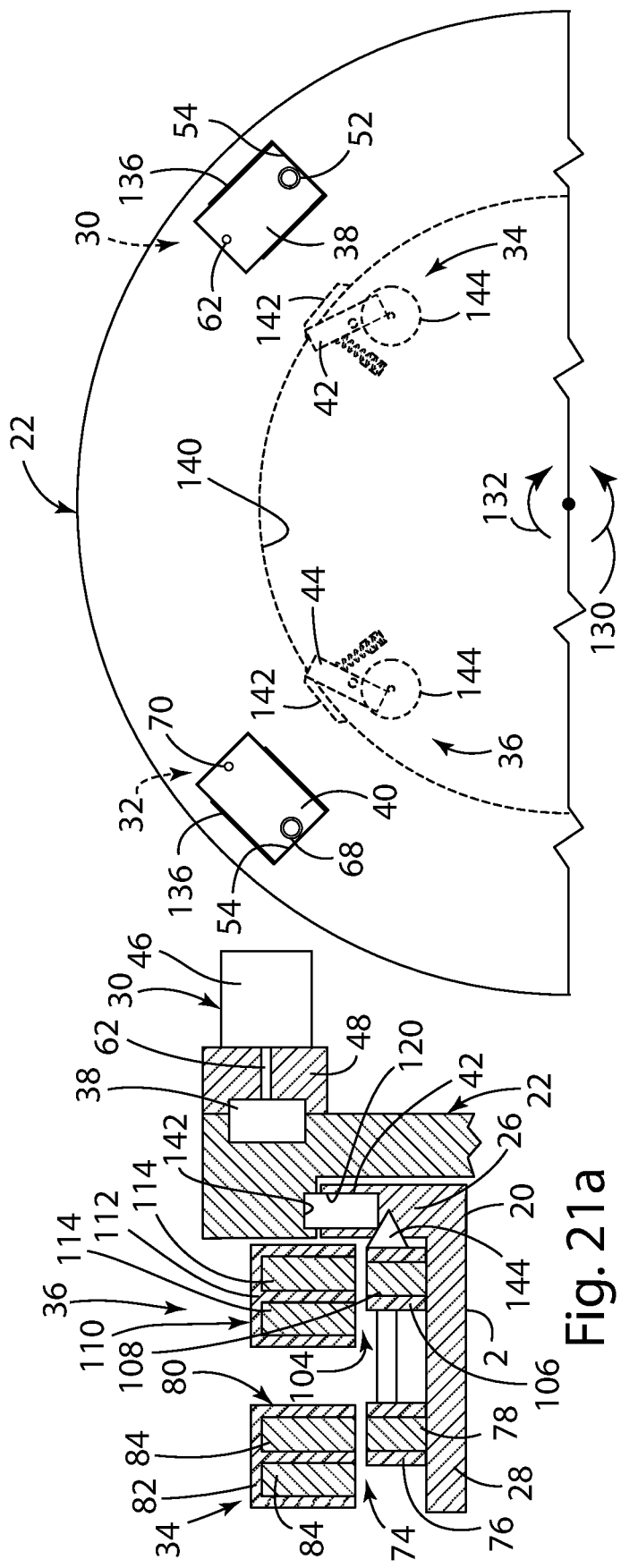
FIG. 21A is a cross-sectional schematic side view illustrating a clutch assembly or module, with portions removed, according to another additional embodiment.
FIG. 21B is a cross-sectional schematic side view of a portion of the clutch assembly of FIG. 21A from the right side of the notch plate with portions removed.

FIGS. 21A and 21B show a further alternative embodiment of the clutch assembly or module 10 wherein the first and second controllable mechanical diode clutches (CMD) 30, 32 are adjacent to a side face 134 of the combination or shared notch plate 22. The struts 38, 40 of the first and second controllable mechanical diode clutches (CMD) 30, 32 extend longitudinally and engage notches 136 in the side face 134 of the combination or shared notch plate 22. The first and second dynamic controlled clutches 34, 36 act on an inner radial circumferential surface 140 of the combination or shared notch plate 22. The struts 42, 44 of the first and second dynamic controlled clutches (DCC) 34, 36 extend radially outward and engage notches 142 in the inner radial circumferential surface 140 of the combination or shared notch plate 22.

FIGS. 21A and 21B illustrate a mode of the clutch assembly or module 10 configured as follows: dynamic controlled clutches (DCC) 1/1 and controllable mechanical diode clutches (CMD) 1/1. This is but one example of a mode of the clutch assembly or module 10. The clutch assembly or module 10 illustrated in FIGS. 20A and 20B, like the previously disclosed examples, also has up to sixteen modes of operation.

While examples or exemplary embodiments are described above, it is not intended that these embodiments describe all possible forms of the present invention. The words used in the specification are words of description rather than limitation. It is understood that various changes may be made without departing from the spirit and scope of the present invention. Additionally, the features of various implementing embodiments may be combined to form further embodiments of the present invention.

The description of the invention is merely exemplary in nature; thus, variations that do not depart from the gist of the invention are intended to be within the scope of the invention. Such variations are not to be regarded as a departure from the spirit and scope of the invention.

What is claimed is:

1. A clutch assembly comprising:
   a housing;
   a rotatable input shaft fixed to a pocket plate;
   a rotatable output shaft fixed to a notch plate;
   a first selectable one-way clutch coupling the housing to the output shaft;

a second selectable one-way clutch coupling the housing to the output shaft, the second selectable one-way clutch operating independently of the first selectable one-way clutch;

a third selectable one-way clutch coupling the input shaft to the output shaft, the third selectable one-way clutch including a stator, a translator, and a locking element wherein the translator rotates with and moves axially relative to the pocket plate and affects movement of the locking element;

a fourth selectable one-way clutch coupling the input shaft to the output shaft, the fourth selectable one-way clutch including a stator, a translator, and a locking element wherein the translator rotates with and moves axially relative to the pocket plate and affects movement of the locking element, the fourth selectable one-way clutch operating independently of the third selectable one-way clutch; and the first selectable one-way clutch includes a solenoid, a plunger, and a locking element wherein the plunger affects movement of the locking element, and the second selectable one-way clutch includes a solenoid, a plunger and a locking element wherein the plunger affects movement of the locking element.

2. The clutch assembly of claim 1 including:
the output shaft having a first direction of rotation and a second direction of rotation;
the first selectable one-way clutch couples the housing to the output shaft in the first direction of rotation; and
the second selectable one-way clutch couples the housing to the output shaft in the second direction of rotation.

3. The clutch assembly of claim 1 including:
the output shaft having a first direction of rotation and a second direction of rotation;
the third selectable one-way clutch couples the input shaft to the output shaft in the first direction of rotation; and
the fourth selectable one-way clutch couples the input shaft to the output shaft in the second direction of rotation.

4. The clutch assembly of claim 1 including:
the output shaft having a first direction of rotation and a second direction of rotation;
the first selectable one-way clutch couples the housing to the output shaft in the first direction of rotation;
the second selectable one-way clutch couples the housing to the output shaft in the second direction of rotation;
the third selectable one-way clutch couples the input shaft to the output shaft in the first direction of rotation; and
the fourth selectable one-way clutch couples the input shaft to the output shaft in the second direction of rotation.

5. The clutch assembly of claim 1 including:
the notch plate is a common notch plate wherein each locking element of each of the first, second, third, and fourth selectable one-way clutches
selectively engages the common notch plate.

6. A clutch assembly comprising:
a housing;
an input shaft;
an output shaft;
a first selectable one-way clutch coupling the housing to the output shaft;
a second selectable one-way clutch coupling the housing to the output shaft, the second selectable one-way clutch operating independently of the first selectable one-way clutch;

a third selectable one-way clutch coupling the input shaft to the output shaft; and
a fourth selectable one-way clutch coupling the input shaft to the output shaft, the fourth selectable one-way clutch operating independently of the third selectable one-way clutch;

the first selectable one-way clutch having a locking element;
the second selectable one-way clutch having a locking element;
the third selectable one-way clutch having a locking element;
the fourth selectable one-way clutch having a locking element; and
the locking elements of the first selectable one-way clutch, second selectable one-way clutch, third selectable one-way clutch, and fourth selectable one-way clutch engaging a common notch plate.

7. The clutch assembly of claim 6 wherein:
the locking element of the first selectable one-way clutch selectively engages a notch in a radially outer circumferential surface of the common notch plate; and
the locking element of the second selectable one-way clutch selectively engages a notch in a radially outer circumferential surface of the common notch plate.

8. The clutch assembly of claim 7 wherein:
each notch in the radially outer circumferential surface of the common notch plate includes first and second shoulders, the locking element of the first selectable one-way clutch engaging the first shoulder and the locking element of the second selectable one-way clutch engaging the second shoulder.

9. The clutch assembly of claim 6 wherein:
the locking element of the third selectable one-way clutch selectively engages a notch in an axial side face of the common notch plate; and
the locking element of the fourth selectable one-way clutch selectively engages a notch in an axial side surface of the common notch plate.

10. A multimode clutch system comprising:
an input shaft;
an output shaft;
a housing;
a first coupling member, the first coupling member connected to the input shaft;
a second coupling member, the second coupling member connected to the output shaft;
a first selectable one-way clutch acting between the housing and the second coupling member wherein the first selectable one-way clutch stops rotation of the second coupling member in a first direction and allows rotation of second coupling member in a second direction;
a second selectable one-way clutch acting between the housing and the second coupling member wherein the second selectable one-way clutch stops rotation of the second coupling member in the second direction and allows rotation of the second coupling member in the first direction;
a third selectable one-way clutch disposed between the first and second coupling members, the third selectable one-way clutch coupling the first and second coupling members in the first direction of rotation and allowing overrun between the first and second coupling members in the second direction of rotation;
a fourth selectable one-way clutch disposed between the first and second coupling members, the fourth selectable one-way clutch coupling the first and second coupling members in the second direction of rotation and allowing overrun between the first and second coupling members in the first direction of rotation; and each of the first, second, third, and fourth selectable one-way clutches has its own independent actuation mechanism wherein each independent actuation mechanism controls engagement or disengagement of its corresponding selectable one-way clutch and wherein each of the first, second, third, and fourth selectable one-way clutches acts on the second coupling member.

11. The multimode clutch system of claim 10 wherein:
the second coupling member includes multiple notches in multiple surfaces.

12. The multimode clutch system of claim 10 including:
the second coupling member having an axially facing side surface and a radial outer circumferential surface;
the axially facing side surface having a plurality of notches and the radial outer circumferential surface having a plurality of notches;
the first selectable one-way clutch includes a strut selectively engaging a notch in the radial outer circumferential surface of the second coupling member;
the second selectable one-way clutch includes a strut selectively engaging a notch in the radial outer circumferential surface of the second coupling member;
the third selectable one-way clutch includes a strut selectively engaging a notch in the axially facing side surface of the second coupling member; and
the fourth selectable one-way clutch includes a strut selectively engaging a notch in the axially facing side surface of the second coupling member.

13. The multimode clutch system of claim 12 including:
the first coupling member includes an axially facing surface having a plurality of pockets in the axially facing surface; and
the second coupling member includes a radially extending surface and an axially facing surface, the radially extending surface having a plurality of notches in the radially extending surface and the axially facing surface having a plurality of notches.

14. The multimode clutch system of claim 10 wherein the first, second, third, and fourth selectable one-way clutches operate to provide at least 16 modes of operation.

15. A multimode clutch module comprising:
a housing;
an input shaft;
an output shaft;
a first coupling member, the first coupling member connects to and rotates with the input shaft;
a first locking element, and a second locking element, the first and second locking elements located on the first coupling member;
a third locking element and a fourth locking element, the third and fourth locking elements located on the housing;
a second coupling member connected to the output shaft;
each of the first locking element, the second locking element, third locking element, and the fourth locking element independently engage the second coupling member, wherein the output shaft is selectively coupled and decoupled to the housing and input shaft;
a first actuator that acts only on the first locking element;
a second actuator that acts only on the second locking element;
a third actuator that acts only on the third locking element;
a fourth actuator that acts only on the fourth locking element;
the second coupling member includes a single notch plate having a plurality of notches; and
each of the first locking element, the second locking element, the third locking element, and the fourth locking element independently engage a notch in the notch plate.

16. The multimode clutch module of claim 15 including:
the first locking element coupling the input shaft to the output shaft whereby the output shaft rotates with the input shaft in a first direction of rotation;
the second locking element coupling the input shaft to the output shaft whereby the output shaft rotates with the input shaft in a second direction of rotation;
the third locking element coupling the output shaft to the housing whereby the third locking element stops rotation of the output shaft in the first direction of rotation; and
the fourth locking element coupling the output shaft to the housing, whereby the fourth locking element stops the rotation of the output shaft in the second direction of rotation.

17. The multimode clutch module of claim 15 includes at least sixteen modes of operation.

* * * * *